US010048512B2

United States Patent
Krall et al.

(10) Patent No.: US 10,048,512 B2
(45) Date of Patent: Aug. 14, 2018

(54) LOW-CONVERGENCE SPECTACLES

(71) Applicant: eyeBrain Medical, Inc., Costa Mesa, CA (US)

(72) Inventors: Jeffrey P. Krall, Mitchell, SD (US); Aric Plumley, Huntington Beach, CA (US); Gergely T. Zimanyi, Berkeley, CA (US)

(73) Assignee: eyeBrain, Medical, Inc., Costa Mesa, CA (US)

( * ) Notice: Subject to any disclaimer, the term of this patent is extended or adjusted under 35 U.S.C. 154(b) by 0 days.

(21) Appl. No.: 15/289,163

(22) Filed: Oct. 8, 2016

(65) Prior Publication Data

US 2018/0101024 A1 Apr. 12, 2018

(51) Int. Cl.
G02C 7/06 (2006.01)

(52) U.S. Cl.
CPC .............. G02C 7/066 (2013.01); G02C 7/06 (2013.01); G02C 7/068 (2013.01); G02C 2202/06 (2013.01)

(58) Field of Classification Search
CPC ........ G02C 7/041; G02C 7/042; G02C 7/043; G02C 7/045; G02C 7/06; G02C 7/061; G02C 7/066; G02C 2202/06
USPC ............ 351/159.05, 159.06, 159.41, 159.42, 351/159.43
See application file for complete search history.

(56) References Cited

U.S. PATENT DOCUMENTS

| 3,245,745 A | 4/1966 | Hancock |
| 4,056,311 A | 11/1977 | Winthrop |
| 4,222,639 A | 9/1980 | Sheedy |

(Continued)

FOREIGN PATENT DOCUMENTS

| CN | 1438852 A | 8/2003 |
| CN | 103815866 A | 5/2014 |

(Continued)

OTHER PUBLICATIONS

Teitelbaum et al., "Effectiveness of Base in Prism for Presbyopes with Convergence Insufficiency," Optometry and Vision Science, vol. 86, No. 2, Feb. 2009, pp. 153-156.

(Continued)

*Primary Examiner* — Darryl J Collins

(57) ABSTRACT

A convergence-reducing lens of a low-convergence spectacle is characterized by a central normal of the convergence-reducing lens that defines a z-axis, and a center of the convergence-reducing lens defines a tangential, centered x-y plane, together defining an x-y-z coordinate system, the convergence-reducing lens comprising a distance-vision region, having a non-negative distance-vision optical power, configured to refract a light ray, directed parallel to the z-axis at a distance-vision region point at an x-distance from a y-z plane of the coordinate system, to intersect the y-z-plane at a distance-vision intersection z-distance; and a near-vision region, having a near-vision optical power that matches the distance-vision optical power within 0.5 D, configured to refract a light ray, directed parallel to the z-axis at a near-vision region point at the x-distance of the distance-vision region point, to intersect the y-z-plane at a near-vision intersection z-distance that is greater than the distance-vision intersection z-distance.

17 Claims, 29 Drawing Sheets

(56) References Cited

U.S. PATENT DOCUMENTS

| | | | |
|---|---|---|---|
| 4,240,719 A * | 12/1980 | Guilino | G02C 7/061 351/159.42 |
| 4,253,747 A * | 3/1981 | Maitenaz | G02C 7/065 351/159.42 |
| 4,580,883 A | 4/1986 | Shinohara | |
| 4,606,626 A | 8/1986 | Shinohara | |
| 4,756,305 A | 7/1988 | Mateik et al. | |
| 4,906,090 A * | 3/1990 | Barth | G02C 7/061 351/159.42 |
| 4,961,639 A | 10/1990 | Lazarus | |
| 5,026,151 A | 6/1991 | Waltuck et al. | |
| 5,200,859 A | 4/1993 | Payner et al. | |
| 5,305,028 A | 4/1994 | Okano | |
| 5,381,191 A | 1/1995 | Levy | |
| 5,557,348 A | 9/1996 | Umeda et al. | |
| 5,782,894 A | 7/1998 | Israel | |
| 5,946,075 A | 8/1999 | Horn | |
| 5,969,790 A | 10/1999 | Onaryk | |
| 6,019,470 A | 2/2000 | Mukaiyama et al. | |
| 6,062,691 A | 5/2000 | Markson | |
| 6,106,819 A | 8/2000 | Sucher | |
| 6,142,624 A | 11/2000 | Morris et al. | |
| 6,347,869 B1 | 2/2002 | Xu et al. | |
| 6,364,481 B1 | 4/2002 | O'Connor et al. | |
| 6,505,934 B1 | 1/2003 | Menezas | |
| 6,547,387 B1 | 4/2003 | Katsantones | |
| 6,579,478 B2 | 6/2003 | Lossman et al. | |
| 6,652,097 B2 | 11/2003 | Shirayanagi | |
| 6,776,486 B2 | 8/2004 | Steele et al. | |
| 6,789,898 B2 | 9/2004 | Le Saux et al. | |
| 6,871,954 B2 | 3/2005 | Copeland | |
| 6,956,682 B2 | 10/2005 | Wooley | |
| 7,104,647 B2 | 9/2006 | Krall | |
| 7,216,977 B2 | 5/2007 | Poulain et al. | |
| 7,828,439 B2 | 11/2010 | Krall | |
| 7,976,157 B2 | 7/2011 | Croft et al. | |
| 8,042,940 B2 | 10/2011 | Krall et al. | |
| 8,100,529 B2 | 1/2012 | Kozu | |
| 8,287,124 B2 | 10/2012 | Krall et al. | |
| 8,376,546 B2 | 2/2013 | Kozu | |
| 8,425,034 B2 | 4/2013 | Wietschorke | |
| 9,237,843 B1 | 1/2016 | Krall et al. | |
| 9,274,351 B2 | 3/2016 | Drobe | |
| 9,298,021 B2 | 3/2016 | Krall et al. | |
| 2002/0099305 A1 | 7/2002 | Fukushima et al. | |
| 2006/0092375 A1 | 5/2006 | Menezes et al. | |
| 2006/0139571 A1 | 6/2006 | Poulain et al. | |
| 2006/0170863 A1 | 8/2006 | Krall | |
| 2007/0182923 A1 | 8/2007 | Kitani et al. | |
| 2008/0278676 A1 | 11/2008 | Croft et al. | |
| 2009/0185137 A1 | 7/2009 | Krall | |
| 2009/0290121 A1 | 11/2009 | Drobe et al. | |
| 2010/0066974 A1 | 3/2010 | Croft et al. | |
| 2010/0271590 A1 | 10/2010 | Kitani et al. | |
| 2011/0090455 A1 * | 4/2011 | Gupta | G02C 7/061 351/159.42 |
| 2011/0317127 A1 | 12/2011 | Suzuki et al. | |
| 2012/0019774 A1 | 1/2012 | Krall et al. | |
| 2012/0019775 A1 | 1/2012 | Tyrin et al. | |
| 2012/0019776 A1 | 1/2012 | Giraudet | |
| 2012/0081661 A1 | 4/2012 | Yamakaji | |
| 2012/0200822 A1 | 8/2012 | Kaga et al. | |
| 2012/0307203 A1 | 12/2012 | Vendel et al. | |
| 2013/0265540 A1 | 10/2013 | Esser et al. | |
| 2013/0308099 A1 | 11/2013 | Stack | |
| 2015/0049301 A1 | 2/2015 | Krall et al. | |
| 2015/0212338 A1 | 7/2015 | Qi | |
| 2015/0226983 A1 | 8/2015 | Carmon et al. | |
| 2015/0346515 A1 | 12/2015 | Kozu | |

FOREIGN PATENT DOCUMENTS

| | | |
|---|---|---|
| EP | 02301422 A1 | 3/2011 |
| JP | H10322724 | 4/1998 |
| JP | 2002253509 | 9/2002 |
| JP | 2011072431 | 4/2011 |
| JP | 2012100759 | 5/2012 |
| WO | WO 2007/068819 | 6/2007 |
| WO | WO 2008/012649 | 1/2008 |
| WO | WO 2011/067361 | 6/2011 |
| WO | WO 2012/160741 | 11/2012 |
| WO | WO 2016/020229 | 2/2016 |

OTHER PUBLICATIONS

FOGT et al., "Comparison of Fixation Disparities Obtained by Objective and Subjective Methods," Vision Res., vol. 38, No. 3 (1998), pp. 411-421.

Shapiro, Jonathan, "Parallel-Testing Infinity Balance, Instrument and Technique for the Parallel Testing of Binocular Vision," Optometry and Vision Science, vol. 72, No. 12, pp. 916-923 (1995).

Remole et al., "Objective Measurement of Binocular Fixation Misalignment," American Journal of Optometry and Physiological Optics, vol. 63, No. 8 (1986), pp. 631-838.

Evans, Bruce JW, "Optometric prescribing for decompensated heterophoria," Optometry in Practice, vol. 9 (2008), pp. 63-78.

H. Jay Wisnicki M.D., "Bifocals, Trifocals, and Progressive-Addition Lenses," American Academy of Ophthalmology, vol. XVII, No. 6, Jun. 1999, pp. 1-8.

* cited by examiner

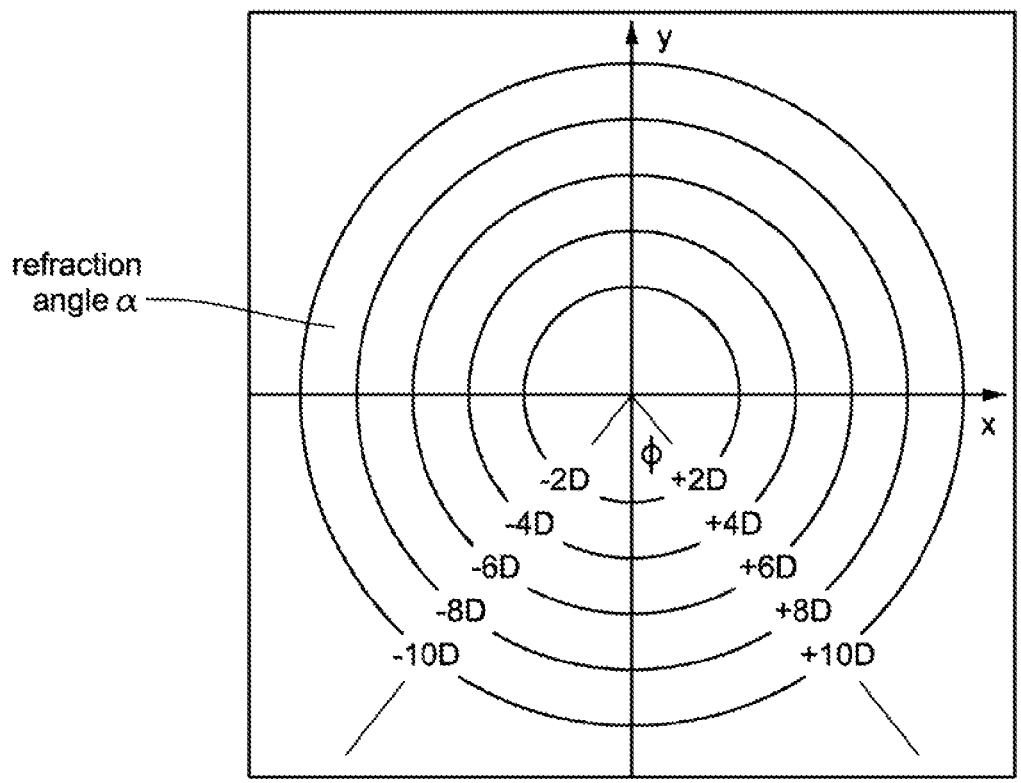
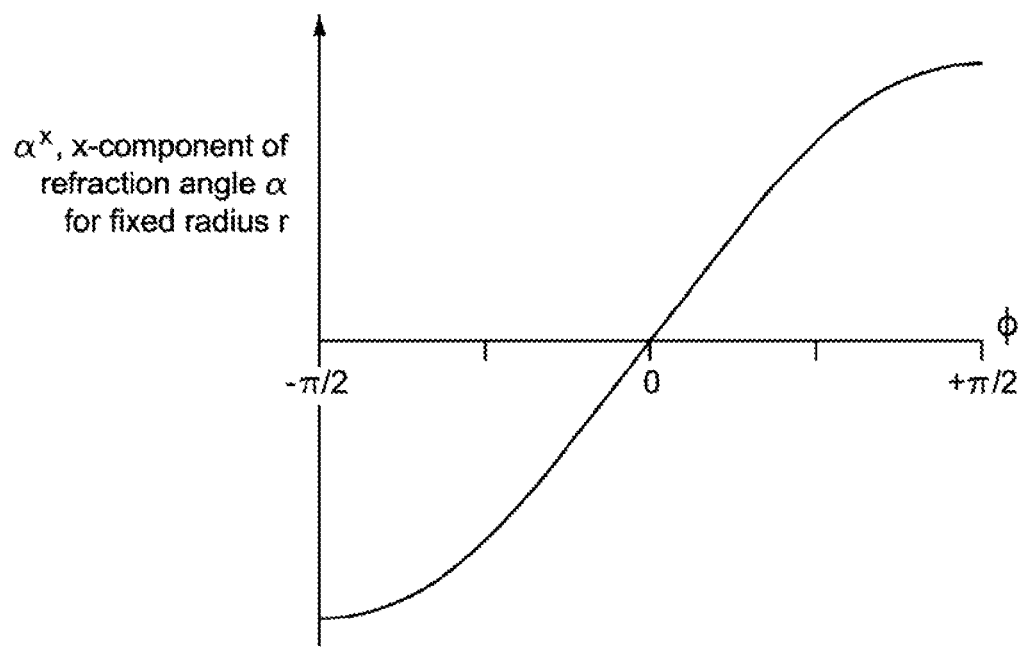
FIG. 2B

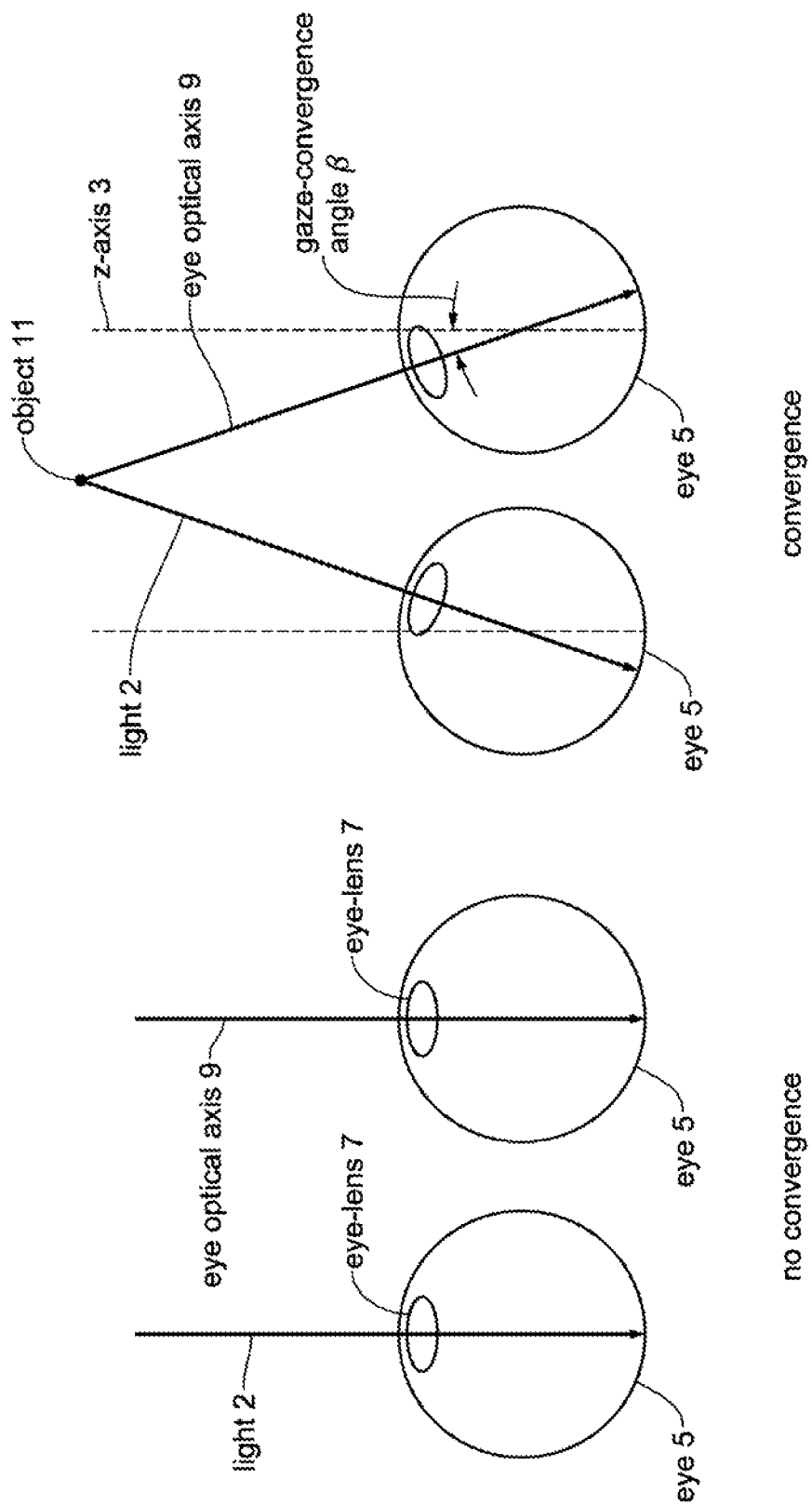

LOW-CONVERGENCE SPECTACLES

FIELD OF INVENTION

This invention relates generally to improved spectacle lenses, in more detail to spectacle lenses that reduce eyestrain and relax convergence, and alters proprioceptive feedback.

BACKGROUND

With normal vision, an individual is able to focus at objects located at different distances. Ideally, an individual is able to focus on distant objects, referred to as distance-vision, and on near objects, referred to as near-vision. The optical system of the eye uses numerous muscles to focus for both distance-vision and for near-vision. These muscles adjust various aspects of the eye when transitioning between distance-vision and near-vision. The muscle adjustments include making subtle changes to the shape of the crystalline lens to adjust the focus of the lens, rotating the eyeballs to rotate their optical axes, and changing the size of the pupils.

Presbyopia is a natural deterioration of near vision caused by loss of flexibility in the eye's crystalline lenses as one ages. Presbyopia can be partially compensated by wearing "reading" glasses that correct near-vision refraction errors so that the eye does not have to focus as strongly when gazing at near objects. Presbyopic persons need different optical corrections for near-vision and for distance-vision. However, using two glasses and changing them with great frequency is distracting. To avoid continually exchanging eyeglasses, bifocals may be used that offer different optical corrections for near-vision and for distance-vision. The transition between these two vision regions can be abrupt or gradual. The latter eyeglasses are called Progressive Addition Lenses (PALs). Abrupt change bifocals have a visible line separating the two vision regions, while PALs have no lines or edges visible between the regions with different dioptric powers.

In spite of all this progress, some types of vision-related discomforts still persist. One of these discomforts is related to a shift of habits in the modern, digital lifestyle. A large and increasing fraction of professions require workers to spend a large and increasing fraction of their working time focusing at close-distance digital interfaces, including computer screens and mobile devices. The same is true for the private lives of many, spending hours playing video games, texting and checking updates on cell phones, among others. All these professional and behavioral shifts rapidly increased the time people spend looking at digital screens, devices, displays, and monitors at a much closer distance than before. The increased time of the eye being trained at near-vision targets places excessive demands on the muscles involved in near-vision, often straining them beyond the comfort zone. This can lead to fatigue, discomfort, pain, or even digitally induced migraines. Up to now, there is no widely accepted consensus on the precise causation mechanism of these digital-device related visual discomforts, pains and migraines. Therefore, there is a need for glasses, or other optometric solutions than can provide relief for digital eye discomforts.

SUMMARY

In some embodiments, a convergence-reducing lens of a low-convergence spectacle is characterized by a central normal of the convergence-reducing lens that defines a z-axis, and a center of the convergence-reducing lens defines a tangential, centered x-y plane, together defining an x-y-z coordinate system of the convergence-reducing lens, the convergence-reducing lens comprising a distance-vision region, having a non-negative distance-vision optical power, configured to refract a light ray, directed parallel to the z-axis at a distance-vision region point at an x-distance from a y-z plane of the coordinate system, to intersect the y-z-plane at a distance-vision intersection z-distance; and a near-vision region, having a near-vision optical power that matches the distance-vision optical power within 0.5 D, configured to refract a light ray, directed parallel to the z-axis at a near-vision region point at the x-distance of the distance-vision region point, to intersect the y-z-plane at a near-vision intersection z-distance that is greater than the distance-vision intersection z-distance.

In some embodiments, a convergence-reducing lens is characterized by a central normal of the convergence-reducing lens defines a z-axis, and a center of the convergence-reducing lens defines a tangential, centered x-y plane, together defining an x-y-z coordinate system of the convergence-reducing lens, the convergence-reducing lens comprising a distance-vision region, having a non-negative distance-vision optical power, configured to refract a light ray, directed by a source at a distance-vision region point at an x-distance from a y-z plane of the coordinate system, to make a distance-vision light-convergence angle with the y-z-plane, wherein the source is located on the z-axis at an intersection z-distance from a center of the coordinate system; and a near-vision region, having a near-vision optical power that matches the distance-vision optical power within 0.5 D, configured to refract a light ray, directed by the source at a near-vision region point at the same x-distance from the y-z plane of the coordinate system, to make a near-vision light-convergence angle with the y-z-plane, wherein the source is located on the z-axis at the same intersection z-distance from the center of the coordinate system; wherein an x-component of the near-vision light-convergence angle is greater than an x-component of the distance-vision light-convergence angle.

BRIEF DESCRIPTION OF THE DRAWINGS

FIGS. 2A-C illustrate the refraction angles of a monovision lens.

FIGS. 3A-B illustrate the induced refraction, increasing the gaze convergence angle.

DETAILED DESCRIPTION

Figure 1A:
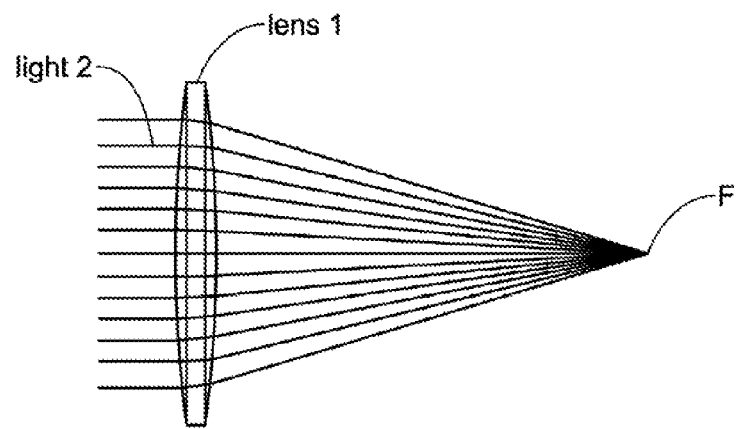
FIGS. 1A-B illustrate the refraction angle of optical lenses.

Embodiments of the invention are placed into context by first describing how regular, positive power lenses of existing spectacles induce increased gaze-convergence angles for near-vision, thus exacerbating already existing digital eye-strain. This will be followed by the description of the embodiments of the invention FIG. 1A illustrates how a typical, positive power mono-vision optical lens 1 effects incident light rays 2. When parallel rays 2 are incident on the lens 1, the lens 1 focuses them into a focus point F.

Figure 1B:
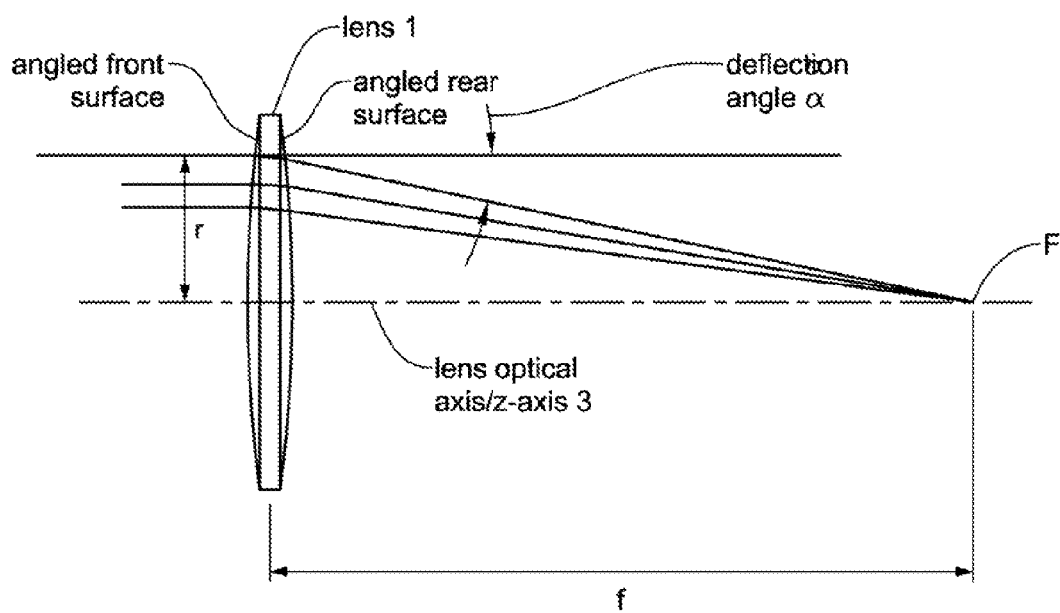

FIG. 1B zooms in on an off-center, or off-axis portion of the incident light rays. Visibly, the off-center, or off-axis parallel rays are refracted towards the focus point F by the angled front surface and the angled back surface of the lens 1 according to well-established laws of light-refraction. The overall effect of the light rays propagating through these two angled surfaces is that they get refracted by an induced angle of refraction $\alpha$.

There are different, related ways to characterize the amount of refraction by a lens region at a radial distance r from the axis. One characterization is by the refraction angle $\alpha$ itself. Another is by the tangent of this same refraction angle, expressed as a ratio of r, the radial distance of the region of the lens from a lens optical axis 3, to f, the focal distance of the lens:

$$\tan \alpha = r/f. \quad (1)$$

This relation shows that a lens of optical power of D diopters, defined as $D=1/f[1/m]$, induces a refraction angle $\alpha$ for rays that are incident at the lens at a radial distance r from the axis 3 of the lens 1, where $\alpha$ is given by $$\tan \alpha = r*D. \quad (2)$$

Figure 2A:
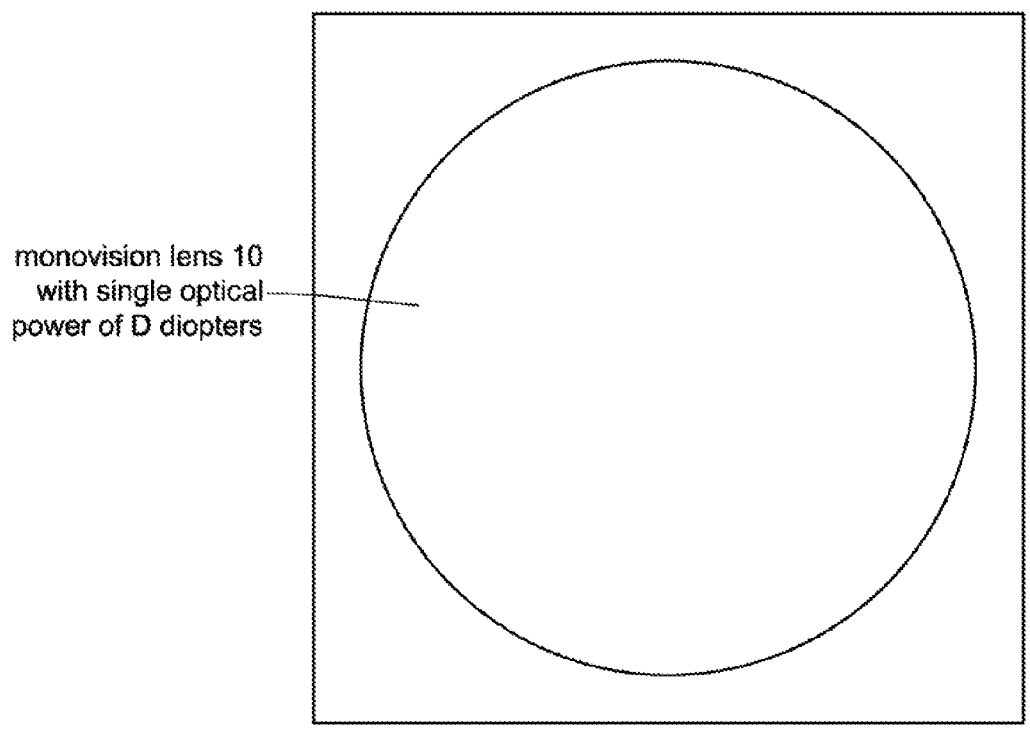

FIG. 2A illustrates a simple mono-vision lens 10 with optical power D.

FIG. 2B illustrates the above notion that the angled surfaces of the mono-vision lens 10 of FIG. 2A induce a refraction angle $\alpha$ in regions away from the axis of the lens. Since the magnitude of the refraction angle $\alpha$ depends only on the radial distance from the axis, the iso-$\alpha$ contours, i.e. the points where the magnitudes of the refraction angle $\alpha$ are equal form concentric circles. The shown circles have radii of about r=0.8 mm, r=1.6 mm, r=2.4 mm, r=3.2 mm, and r=4.0 mm. Equation (2) provides that tan $\alpha$, the tangent of the refraction angle $\alpha$ is given as the product of the radius r and the optical power D. Here, the units of D are [1/m], and the units of r are [m]. Since typical values of r are 1-20 millimeters, and values of D are a couple diopters [1/m], tan $\alpha$ is typically of the order of $10^{-3}$-$10^{-2}$ radian, which translates to a few-to-a-few-tens of arc-minutes. As an example, for r=1 mm, and D=1[1/m], tan $\alpha$=1*10$^-$ radian=3.5 arc-minutes. At small angles, tan $\alpha$ is well approximated by $\alpha$. Therefore, returning to FIG. 2A, on the shown circles the deflection angle $\alpha$ takes the values 2.8 D, 5.6 D, 8.4 D, 11.2 D and 14 D, in arc minutes.

Finally the lower graph of FIG. 2B illustrates $\alpha^x$, the x-component of the refraction angle $\alpha$, where the x-y coordinate system is based at the center of the lens 10, with its axes being horizontal and vertical in the plane of the lens 10, as shown. There are several ways to define $\alpha^x$ that are analogous to each other. One practical definition is $\alpha^x=\sin \Phi*\alpha$, where $\Phi$ is the angle measured from the negative, or lower half of the y-axis, pointing straight down in the plane of FIG. 2B, as shown. Combining with Eq. (2), and using that sin $\Phi*r=x$, the x coordinate of the radial vector of length r, one gets the simple relation:

$$\alpha^x = x*D. \quad (3)$$

The lower graph in FIG. 2B shows $\alpha^x$ as a function of the angle $\Phi$ in general. The upper figure shows the particular values of $\alpha^x$ along the +45 degree and along the −45 degree lines, using sin($\pm$45)=$\pm$0.7. These values are: $\alpha^x$=$\pm$2 D, $\pm$4 D, $\pm$6 D, $\pm$8 D and $\pm$10 D, as shown.

Analogous definitions of $\alpha^x$ include tan $\alpha^x$=sin $\Phi*$tan $\alpha$, which accounts more precisely for the geometry of projections of a refracted light 2. However, for the present small angles these two definitions yield very similar mathematical relations and numerical values. Finally, the formula can be extended for light rays 2 that are not parallel with the optical axis 3, but, rather, make an angle with the optical axis 3. In general, such extensions would yield an object-angle dependent expression, through a dependence on the angle $\beta$. Notably though, such a $\beta$-dependent formula can be expanded in $\alpha$. Such an expansion would reproduce Eq. (2) in leading order in $\alpha$.

$\alpha^x$ characterizes the x-component of the refraction angle $\alpha$ that in turn determines how much a wearer of the spectacle need to turn her/his gaze to concentrate on these light rays. The larger the $\alpha^x$ in a region of the lens, the more the light 2 passing through this region is refracted by the lens and the more a wearer has to turn her/his gaze.

Figure 2C:
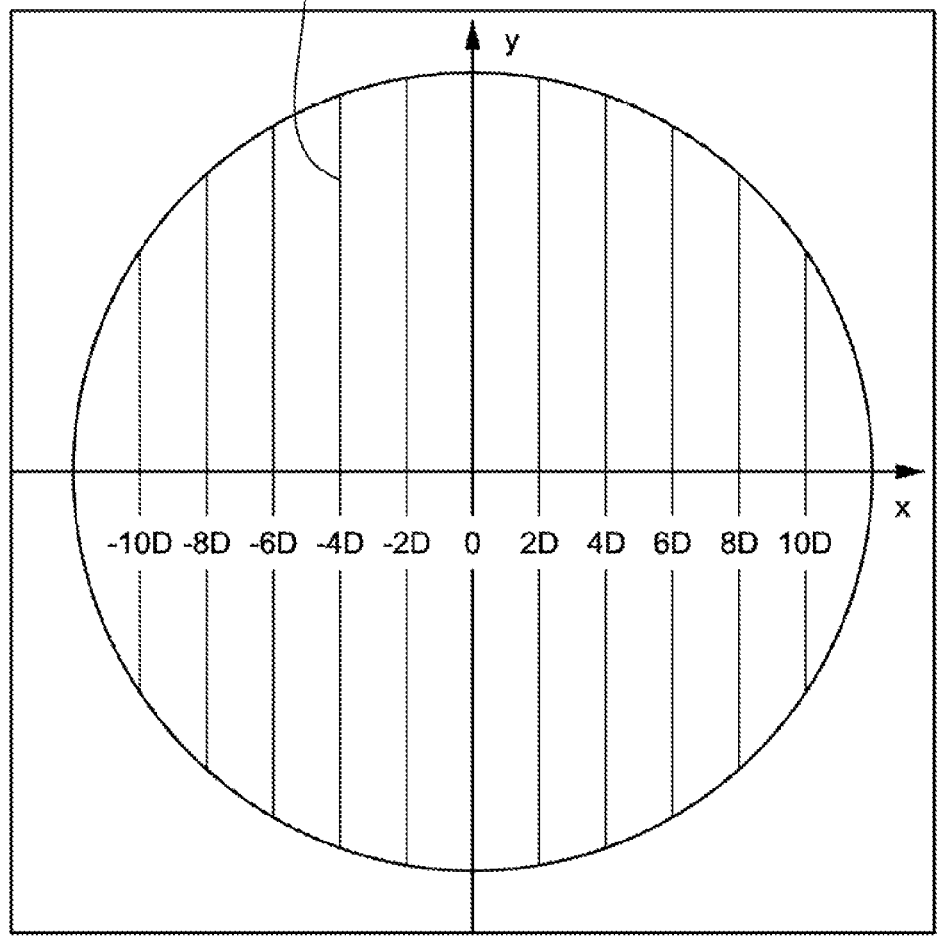

FIG. 2C illustrates the iso-$\alpha^x$ contours for the lens 10 of FIG. 2B, where $\alpha^x$ assumes the same values. Visibly, for the mono-vision lens 10 of optical power D, the iso-$\alpha^x$ contours are approximately straight lines parallel to the y-axis, since $\alpha^x$ only depends on the x coordinate of the points of the contour. For larger optical powers and radii, where the linear approximations start to garner corrections, the iso-$\alpha^x$ contours start bulging radially outward close to the x-axis.

FIGS. 3A-B illustrate how the refraction angle, induced by a positive power lens, impacts the convergence of the gaze of glass-wearers, based on these general considerations.

FIG. 3A illustrates that when a person is gazing at a remote object, then the gazing-directions of the left and right eyes are essentially parallel, and thus there is no convergence of the gazing-directions and the eye muscles are not strained at all. In such cases, the two z-axes 3, pointing to the remote object through the center of the eye 5, coincide with the two eye-optical axes 9. The light 2 from the remote object is entering the eye 5 through the eye-lens 7 on its way to hit the retina of the eye 5. These parallel axes will be used as references to characterize the gaze-convergence angles of gazes directed at near objects through various lenses next.

FIG. 3B illustrates that when a person is gazing at a near object, the gazes of the left and right eyes are tilted, or rotated, towards each other, each gaze making a non-zero gaze-convergence angle $\beta$ with the z-axes 3. Since the gaze-convergence angle $\beta$ characterizes the convergence of the gazes of the two eyes towards each other, in what follows the gaze-convergence angle $\beta$ will refer specifically to the x-component of the overall gaze-rotation angle of the eye. This makes the gaze-convergence angle $\beta$ analogous to the x-component of the refraction angle $\alpha^x$, while also simplifying the terminology.

As mentioned before, the eyeballs are rotated by muscles attached externally to the eye. In particular, the lateral, x-directional, rotations are controlled by the medial rectus and the lateral rectus muscles, and the vertical rotations are controlled by the superior rectus and the inferior rectus, and inferior oblique muscles. When the medial rectus muscles of the left-eye and the right-eye contract, the gazes of these eyes converge towards each other. A person, training his/her eye on a near object, such as an electronic screen, a digital screen, a screen of a mobile electronic device, work-related papers, or even a book, for extended periods requires the continuous contraction of the medial rectus muscles, thus exerting substantial strain on them. This "digital eyestrain" can lead to fatigue, leading to headache, eventually culminating in migraines, caused by the demands of the modern, digital lifestyle.

The digital lifestyle can induce other forms of asthenopia, or eye-strain, and other types of convergence-disorders, including proprioceptive disparity, and fixation disparity. Proprioceptive disparity is an imbalance between where the eyes are consciously focused and the nonvisual perception of where the object is located in space. This disparity often varies with space. The brain of a patient with a proprioceptive disparity can compensate this disparity to a degree in order to maintain a clear image of the target. However, when the disparity becomes too big to be compensated, the trigeminal nerve can get overstimulated, resulting in patients experiencing headaches, eye fatigue, pain around the eyes, blurred vision, neck pain, dry eyes, and other general symptoms of asthenopia.

A class of symptoms especially worthy of mentioning is Computer Vision Syndrome (CVS), which is estimated to affect more than 100 million Americans. Computer Vision Syndrome is the physical eye discomfort felt after a prolonged amount of time in front of digital devices at near, causing an array of unnecessary symptoms, and can have effects on productivity.

Another large class of symptoms is known by the name of Chronic Daily Headaches (CDH). CDH symptoms are estimated to affect more than 30 million Americans. These patients suffer from an over-stimulation of the trigeminal nerve that manifests itself in the form of chronic daily headaches. Various factors and triggers are believed to contribute to the debilitating issue of chronic daily headache. As a result, patients suffering from CDH are limited to treatment options that merely seek to dull the symptoms. A large subset of chronic daily headache patients (believed to be as large as 33% of the population) shows objective signs of a misalignment between how the central visual system, peripheral visual system and neurological system interact.

Figure 4A:
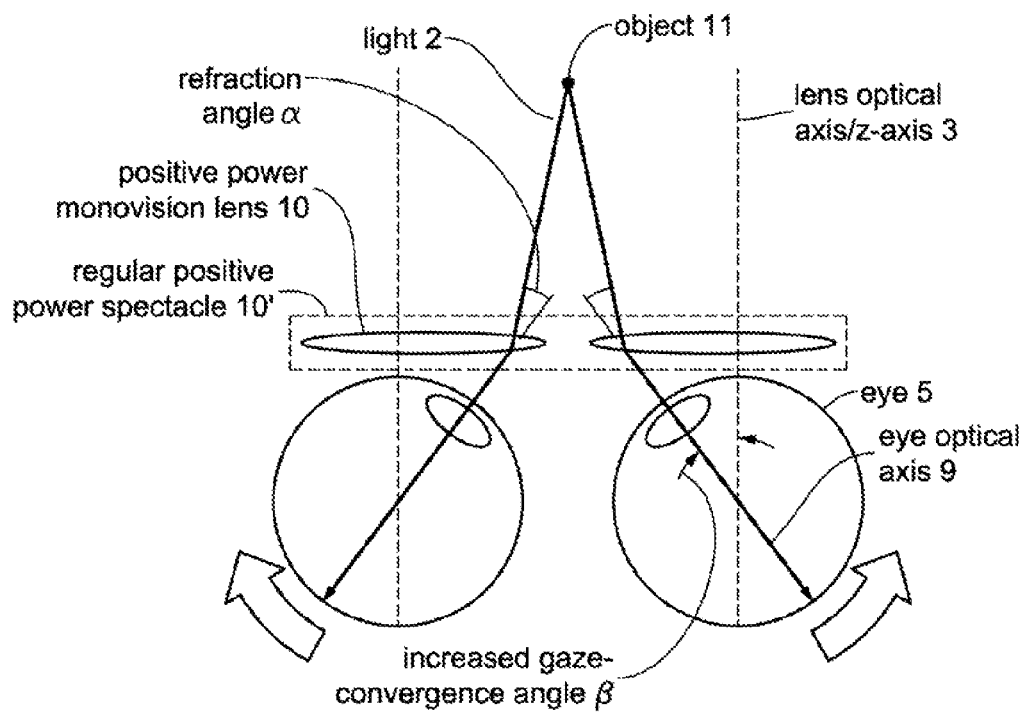
FIGS. 4A-B illustrate an effect of a convergence-reducing lens.

FIG. 4A illustrates that positive power spectacles 10' can exacerbate the symptoms of eye-strain, astenophia, Computer Vision Syndrome and proprioceptive disparity, caused by digital devices, because looking at digital devices, or objects 11 that are nearby forces the wearer to gaze through the lower-inferior nasal quadrant, the "near-vision" region, of their glasses. As shown before, in this off-center near-vision region positive power lenses 10 refract the light by a refraction angle α, as described by Eqs. (1)-(3). A ray that propagates from the near object 11 to the retina with the refraction angle α forces on the wearer a greater gaze-convergence angle β than a ray that propagates from the same object to the same retina but without the refraction angle α. Therefore, positive power lenses 10 force an increased gaze-convergence angle β and thus cause an increased strain on the medial rectus muscles when the wearer is looking at near objects. The sustained and excessive contraction of the medial rectus muscles increases the tendencies for a digital migraine that affect and possibly debilitate the wearer.

Figure 4B:
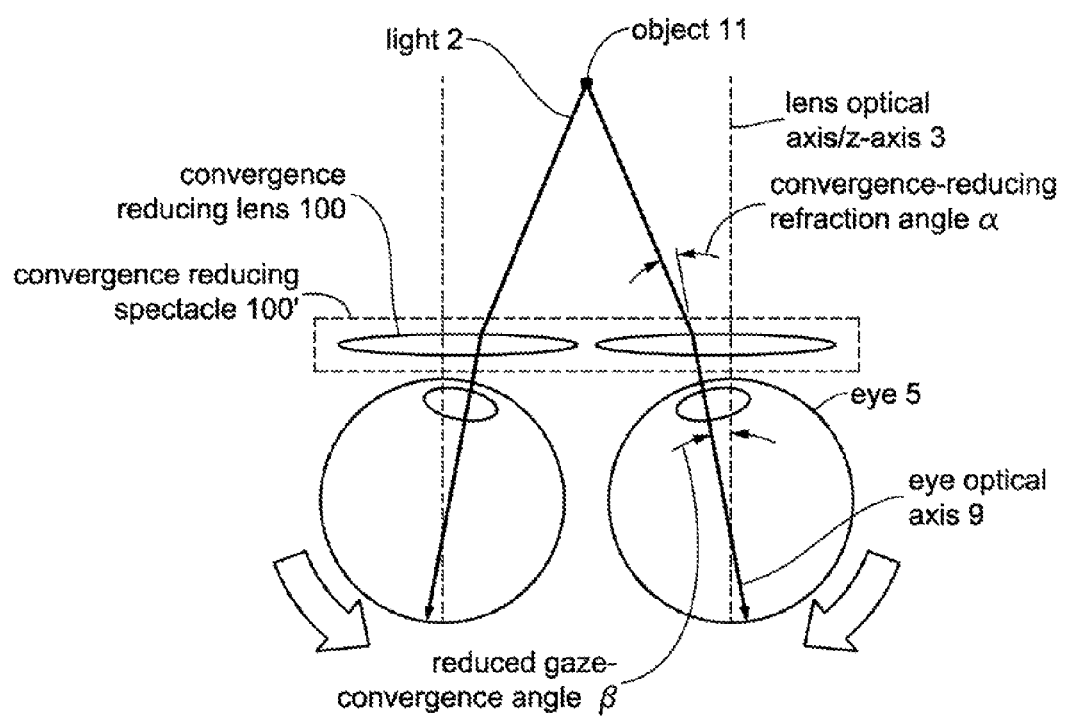

FIG. 4B illustrates embodiments of a convergence-reducing lens 100 in a convergence-reducing spectacle 100' that can reduce, and often eliminate the symptoms caused by eye-strain, astenophia, Computer Vision Syndrome and proprioceptive disparity. The convergence-reducing spectacles 100' with convergence-reducing lenses 100 have a suitably modified refraction-angle α that reduces the gaze-convergence angle β when their wearers look at a nearby object, such as at a digital device. Reduced gaze-convergence angles β require a lesser rotation of the eyes in the nasal direction, and therefore relieve the continuous contraction and strain of the medial rectus muscles of the eyes. This reduced muscle strain reduces and often eliminates digital migraines.

Figure 5A:
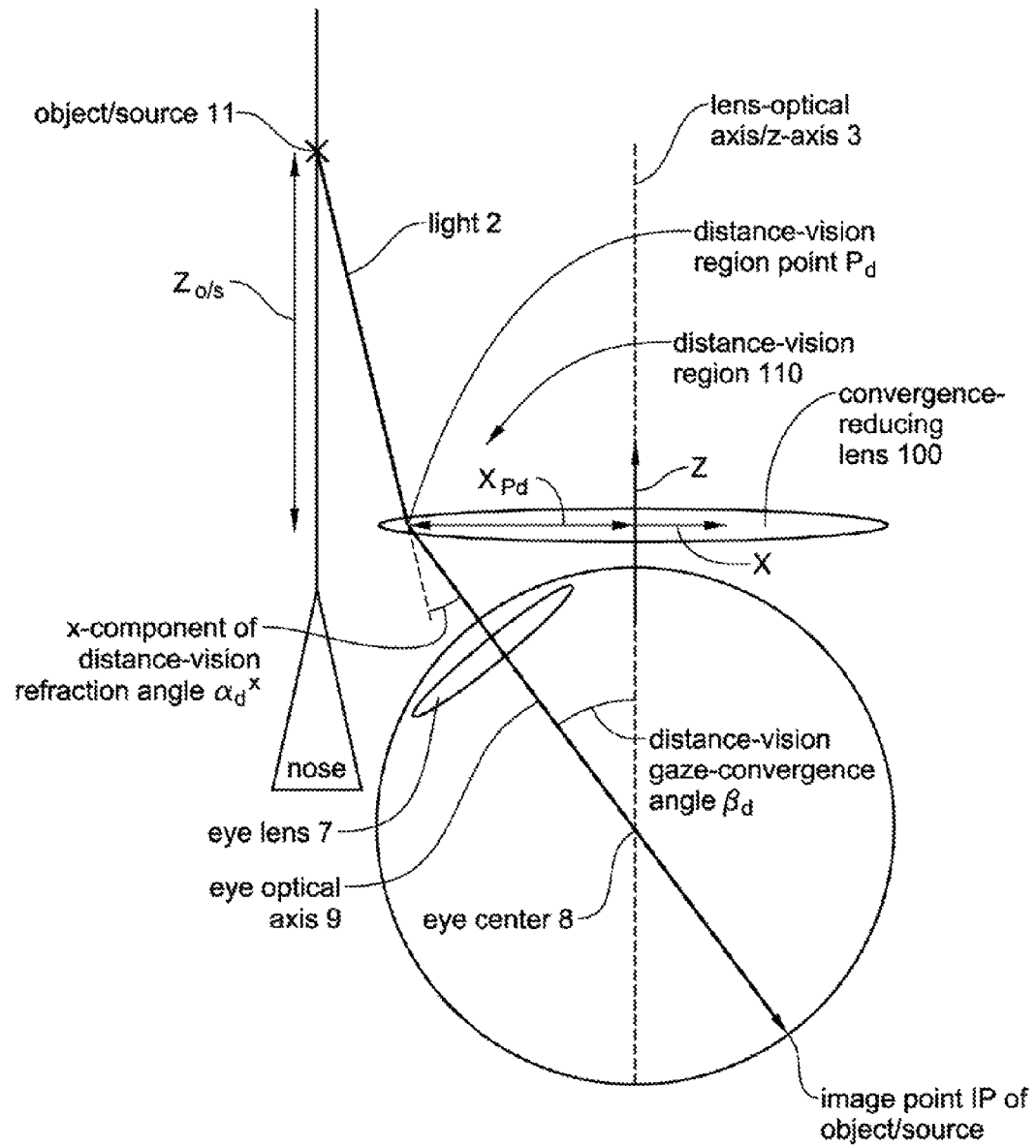
FIGS. 5A-D illustrate light propagation in convergence-reducing lenses.
Figure 5B:
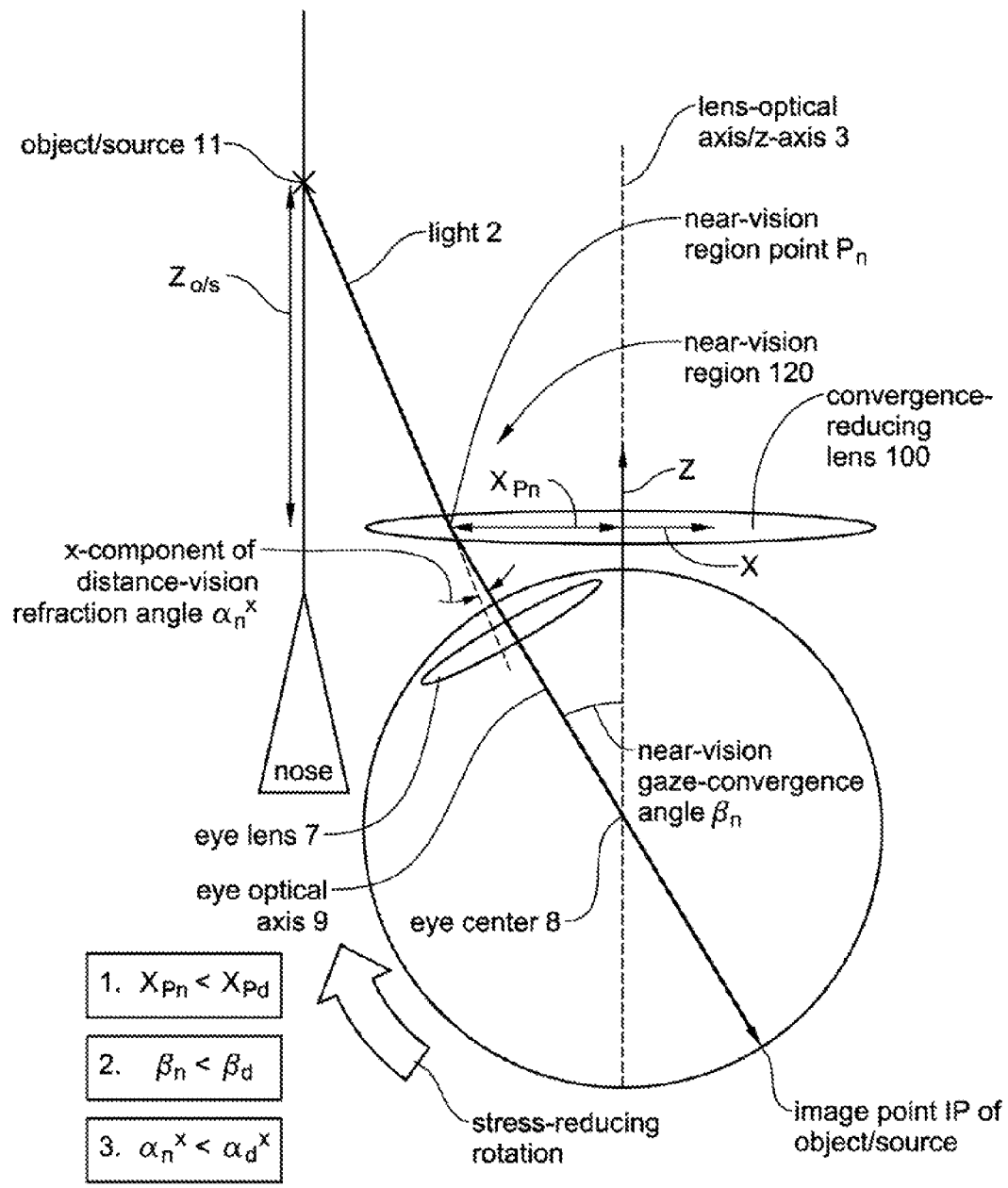

FIGS. 5A-B illustrate in detail an embodiment of an eye-strain-reducing lens 100, or convergence-reducing lens 100 that relieves eye-strain and related digital eye discomforts. Throughout this application, the terms eye-strain-reducing lens and convergence-reducing lens will be used and treated interchangeably. For clarity, only one of the convergence-reducing lenses 100 of the convergence-reducing spectacle 100' are shown. The below description applies for the other lens of the convergence-reducing spectacle 100' with the appropriate modifications. A nose of the spectacle-wearer is shown for reference. Embodiments of the convergence-reducing lens 100 can define an x-y-z coordinate system as follows. A central normal of the convergence-reducing lens 100 can define a z-axis 3, and a central region of the convergence-reducing lens 100 can define a tangential, centered x-y plane. The center of the coordinate system can be at the center of the lens 100. The convention is adopted that the x-axis is "horizontal" with respect to the spectacle 100', and thus goes through the centers of both the left and the right convergence-reducing lenses 100. Accordingly, the y-axis is vertical.

Figure 8A:
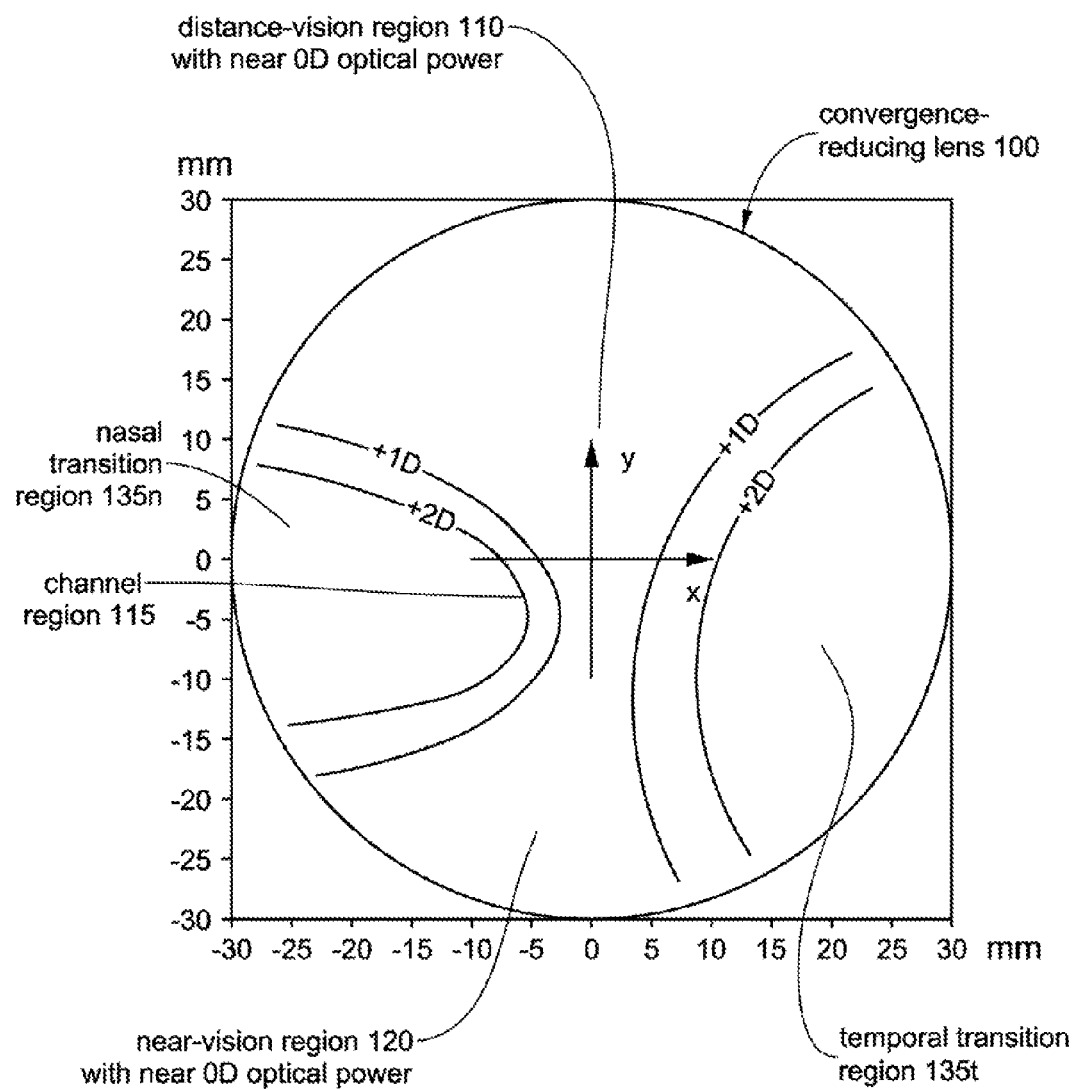
FIGS. 8A-C illustrate contour-representations of various convergence-reducing lenses for near-zero optical powers.

With this coordinate system, and with further reference to FIG. 8A, the convergence-reducing lens 100 can include a distance-vision region 110, having a non-negative distance-vision optical power, configured to refract a light ray 2, directed by a source 11 at a distance-vision region point $P_d$ at a distance-vision x-distance $x_{P_d}$ from a center of the coordinate system, to propagate to an eye-center representative location 8. In some embodiments, the eye-center representative location 8 can be an eye center 8 itself. In other embodiments, it can be a sensor, positioned at the location 8, or a screen, positioned across location 8, wherein the eye-center representative location 8 lies on the z-axis 3, at a z-distance in the range of 15-25 mm from the center of the lens's coordinate system in a direction that is opposite to the direction of the source. These latter eye-center representative locations 8 can be more suitable and accessible for measurements and characterizations.

The convergence-reducing lens 100 can further include a near-vision region 120, having a near-vision optical power that matches the distance-vision optical power within 0.5 diopters D, configured to refract a light ray 2, directed by the source 11 at a near-vision region point $P_n$ at a near-vision x-distance $x_{P_n}$ from the center of the coordinate system, to propagate to the eye-center representative location 8. Since the optical power of the near-vision region 120 can be very close, and in some embodiments, equal to the optical power of the distance-vision region 110, embodiments of the convergence-reducing lens 100 can be called a mono-vision lens, or a single-vision lens. This aspect can distinguish these lenses from other, traditional bi-focal lenses where the near-vision and distance-vision optical powers are different.

For clarity, in this document the term "optical power" refers to the optical power specifically related to the focal length f of the lens, and is measured in diopters D that are inversely related to the focal length: $D=1/f$. Also, FIG. 5A can be a cross section of the convergence-reducing lens 100 at a high, positive y coordinate, whereas FIG. 5B may illustrate a cross section of the same convergence reducing lens 100 at a lower, negative y coordinate.

In embodiments, the near-vision x-distance $x_{Pn}$ is smaller than the distance-vision x-distance $x_{Pd}$, as shown. Visibly, since in these embodiments the near-vision x-distance $x_{Pn}$ is smaller than the distance-vision x-distance $x_{Pd}$, the wearer of this convergence-reducing lens 100 can rotate an eye-optical axis 9 of his/her eye closer toward the z-axis 3 when looking at the source 11 through the near-vision region 120 relative to the case when the wearer is looking at the same source 11 through the distance-vision region 110, thereby reducing the gaze convergence angle, as described further next. As indicated in FIG. 5B, the reduced gaze-convergence angle β translates into a stress-reducing rotation of the eye 5. Accordingly, the convergence-reducing lens 100 can also be called an eye-strain reducing lens 100. For this reason, the convergence-reducing spectacles 100' deliver the much-needed medical benefit of reducing eye-strain, digital migraines, proprioceptive disparity, fixation disparity, asthenopia, and convergence-disorders in general.

A first inventive layer of the described technologies involves bifocal glasses, which already have a near-vision region separate from the usual distance-vision region. Such glasses can be bestowed with the additional medical benefit of eye-strain reduction by making the convergence properties of these two vision regions also different.

Beyond this layer, a distinguishing feature of the here-described single-vision, or monovision convergence-reducing lenses 100 is that they have a near-vision region 120 with a refractive power different from the refractive power of the distance-vision region 110, in spite of the two regions having matching optical powers. This is to be contrasted with bifocal lenses, where both the refractive and the optical powers of the two vision regions are different. This is a qualitative, crucial distinction for at least the following reasons.

(1) Bifocal spectacles already have two vision regions with a differing optical property, the optical power. Therefore, it may occur to a lens designer to make a further optical property also different, such as the refractive power, to reduce convergence. However, in monovision lenses it is far from obvious for a designer to think of and to create a near-vision region for the sole purpose of delivering a different refractive power, while making sure that the near-vision region retains the same optical power as the rest of the lens.

(2) The global market for spectacle lenses exceeded 1 billion units sold worldwide in 2015, and more than 320 million in the US alone. It is also estimated that 75% of the US population, or about 240 million people wear some sort of vision correcting speactacles. By far the broadest market segment of spectacles sold in the US today, about 90% of the total market, have single vision lenses, and only about 10%, or 20-25 million people wear bifocals. The mostly younger and early-middle age wearers of single-vision lenses simply do not need bifocal lenses. Some industry surveys estimate the number of people who suffer, or report, Computer Vision Syndrome to exceed 100 million people. Therefore, introducing convergence-reducing near-vision regions into single vision spectacles will extend the reach of the convergence-reduction technology from the narrow, 10-20 million unit/year market segment of bifocals to the 100 million-plus unit/year market segment of monovision glasses. Therefore, the here-described monovision glasses will dramatically broaden the group of people to whom the medical benefit of convergence-reduction can be delivered.

(3) Convergence-reducing monovision glasses with zero or near zero optical powers will qualitatively broaden the market penetration to yet another wide class. These glasses will deliver the medical benefit of convergence reduction to people who do not need optical power correction and therefore did not think of wearing glasses up to now. For this reason, zero optical power monovision spectacles will dramatically extend the segment of the population to whom the medical benefit of convergence-reduction is delivered even further.

Finally, it is mentioned that in present-day optometric practice, most doctors have a different theory of the cause of eye-strain, and therefore offer very different treatments and procedures to alleviate eye-strain, or asthenopia. Optometrists often prescribe switching to glasses with blue light filters, or suggest using humidifiers. Therefore, prescribing glasses with the here-described convergence-reduction technology rests on a very different medical insight regarding what causes eye-strain, and an inventive treatment to alleviate it that is genuinely different from what is prescribed by today's optometric practitioners.

Here and later in the text, the light propagation is described as originating by the source 11, or from an object 11, interchangeably. The source 11 can be a laser pointer or other directed light source that actively generates a light ray 2. In some other embodiments, the object 11 may not be an active light source, rather, an object or mirror that reflects a light in the described direction, wherein the light originated somewhere else. From the viewpoint of the light propagation, these two cases can be interchangeable. The object 11, or source 11, can be at a z-distance $z_{o/s}$ from the x-y plane of the convergence-reducing lens 100.

In embodiments of the convergence-reducing lens 100, the distance-vision region 110 can be configured to refract the light ray 2, directed by the source 11, or object, 11 at the distance-vision region point $P_d$ at the distance-vision x-distance $x_{Pd}$, to intersect a y-z plane of the coordinate system with a distance-vision gaze-convergence angle $β_d$; whereas the near-vision region 120 can be configured to refract the light ray 2, directed by the source 11 at the near-vision region point $P_n$ at the near-vision x-distance $x_{Pn}$, to intersect the y-z plane with a near-vision gaze-convergence angle $β_n$. In these embodiments of the convergence-reducing lens 100 the near-vision gaze-convergence angle $β_n$ can be smaller than the distance-vision gaze-convergence angle $β_d$. Typically, the intersection of the refracted light 2 with the y-z plane with the gaze convergence angle $β_{n/d}$ occurs at the eye-center representative location 8.

Here, the gaze-convergence angles $β_d$ and $β_n$ characterize the convergence of the left and right eye's gaze, and thus they can correspond to the x-component of the overall, 3d dimensional rotation angle of the eyes, in analogy to $α^x$, the x-component of the overall refraction angle α.

This is a second expression that when the wearer looks at an object 11 through the near-vision region 120 of the convergence-reducing lens 100, she/he does not need to rotate her/his eyes away from the z-axis 3 as much as in the case of looking at the same object through the distance-vision region 110 of the lens 100. Therefore, embodiments of the convergence-reducing lens 100 indeed reduce the convergence angle β of the gaze of its wearer, when looking at objects through the near-vision region 120, compared to looking through the distance-vision region 110, or even through an analogous regular positive power lens 10.

In some embodiments of the convergence-reducing lens 100, the distance-vision region 110 can be configured to refract the light ray 2, directed by or from the source 11 at the distance-vision region point $P_d$ at the distance-vision x-distance $x_{Pd}$, by a distance-vision refraction angle $\alpha_{Pd}$, whereas the near-vision region 120 can be configured to refract the light ray 2, directed by or from the source 11 at the near-vision region point $P_n$ at the near-vision x-distance $x_{Pn}$, by a near-vision refraction angle $\alpha_n$. In such embodiments of the convergence-reducing lens 100, an x-component $\alpha_n^x$ of the near-vision refraction angle $\alpha_n$ can be smaller than an x-component $\alpha_d^x$ of the distance-vision refraction angle $\alpha_d$. This is a third expression that the lens 100 is reducing the gaze-convergence β when its wearer is looking at the object 11 through the near-vision region 120, relative to looking at the same object 11 through the distance-vision region 110.

The above three expressions of the gaze-convergence reducing aspects of the convergence-reducing lens 100 are stated as boxed inequalities in FIG. 5B. These inequalities are repeated here:

$$x_{Pn} < x_{Pd}, \quad (4)$$

$$\beta_n < \beta_d, \text{ and} \quad (5)$$

$$\alpha_n^x < \alpha_d^x. \quad (6)$$

Embodiments of the convergence-reducing lens 100 satisfy at least one of these three inequalities (4)-(6).

The above descriptions of embodiments of the convergence-reducing lens 100 also articulate auditing protocols to determine whether a lens is a convergence-reducing lens. (1) It is possible to measure the described distances $x_{Pd}$ and angles $\alpha_d^x$ and $\beta_d$ directly when a wearer of the lens is looking at an object through a potential distance-vision region of a lens, followed by measuring the corresponding distances $x_{Pn}$ and angles $\alpha_n^x$ and $\beta_n$ as the wearer looks through a potential near-vision region of the lens, and then to compare the measured angles and distances to verify whether they satisfy at least one of the described three inequalities. For potential lenses, where the changes of the angles are small, an eye-tracking or eye-imaging system can be used to determine the changes in the wearer's gaze-angle to detect the small changes and differences. (2) Instead of measuring angles and directions of a wearer's gaze, an eye model with realistic parameters can be used as well. The eye model can include a disk of a diameter of about 20-25 mm, such as 24 mm, rotatable around a y-axis at an eye-center representative location 8. The front of the eye model can be positioned 10-15 mm behind the lens 100, the eye-center representative location 8 about 20-30 mm behind the lens 100. The eye model can include an appropriate eye lens 7, with a total optical power approximately equal to that of the cornea, about 40-45 D, plus that of the lens, about 15-25 D. A directed light source, such as a laser pointer or equivalents can be deployed in place of the source 11 and its light can be pointed at the potential distance-vision region and near-vision region of an audited lens so that after refraction by the lens the light goes through the eye-center representative location 8 of the eye model in both cases. The described angles and distances can then be measured to determine whether at least one of the three above inequalities applies.

(3) Finally, measurements without involving a wearer's eye, or even an eye-model, can also be sufficient to determine whether a lens is an embodiment of the convergence-reducing lens 100. A lens can be audited on a fixed optical table by pointing a laser pointer from a position of the source 11 at the lens such that its light after refraction by the lens propagates through a candidate point for an eye-center representative location 8, about 20-30 mm behind the center of the lens 100 along the z-axis 3. The light's propagation can be tracked, e.g., by implementing a screen in the y-z plane of the lens 100 on the side opposite to the source 11. The light of the laser pointer 11 can be directed at a potential distance-vision region of the audited lens and through a potential near-vision region of the audited lens, ensuring that the refracted light in both cases intersects the y-z plane at the same z-distance from a center of the coordinate system that is representative of an eye center 8. As described above, such representative locations can be 20-30 mm behind the center of the lens, on the z-axis 3. Once the angles and distances, discussed before, are measured for the light directed at the potential distance-vision and then the potential near-vision regions, a lens is an embodiment of the convergence-reducing lens if at least one of the three inequalities in FIG. 5B, and discussed above in Eqs. (4)-(6), holds for the measured angles and distances. Other auditing protocols will be described later, in relation to FIGS. 5C-D and FIGS. 7A-D FIGS. 5A-B illustrate that the object/source 11 can be a near object, located at a source x-distance from the z-axis 3 of the coordinate system that is larger than a radius of the convergence-reducing lens 100, and at a source z-distance that is between 10 cm and 100 cm. Such an off-center, off-axis source 11 can be a good representation of a near object, aligned with a nose of the spectacle wearer, as shown.

Figure 6A:
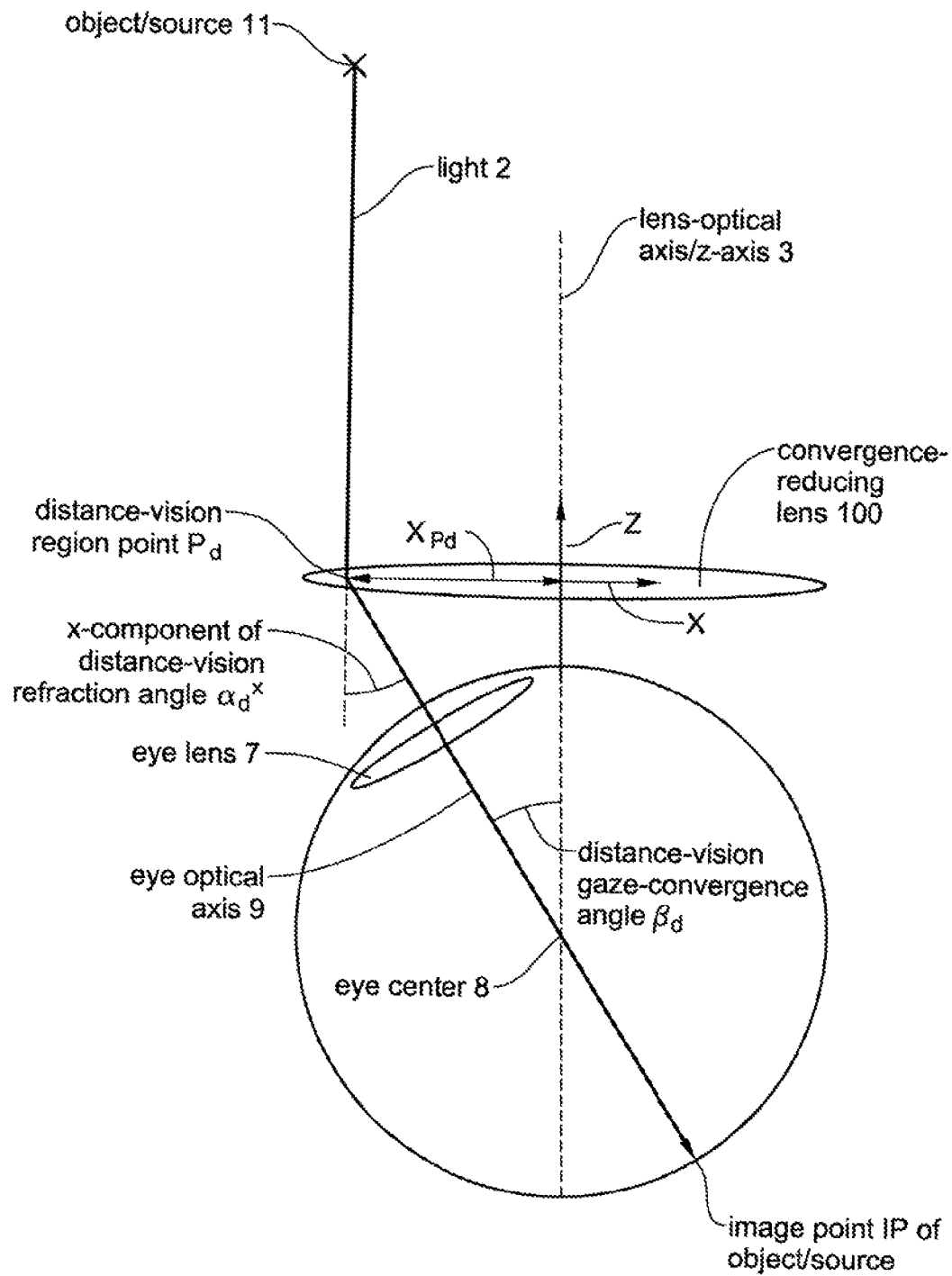
FIGS. 6A-B illustrate embodiments of a convergence-reducing lens.
Figure 6B:
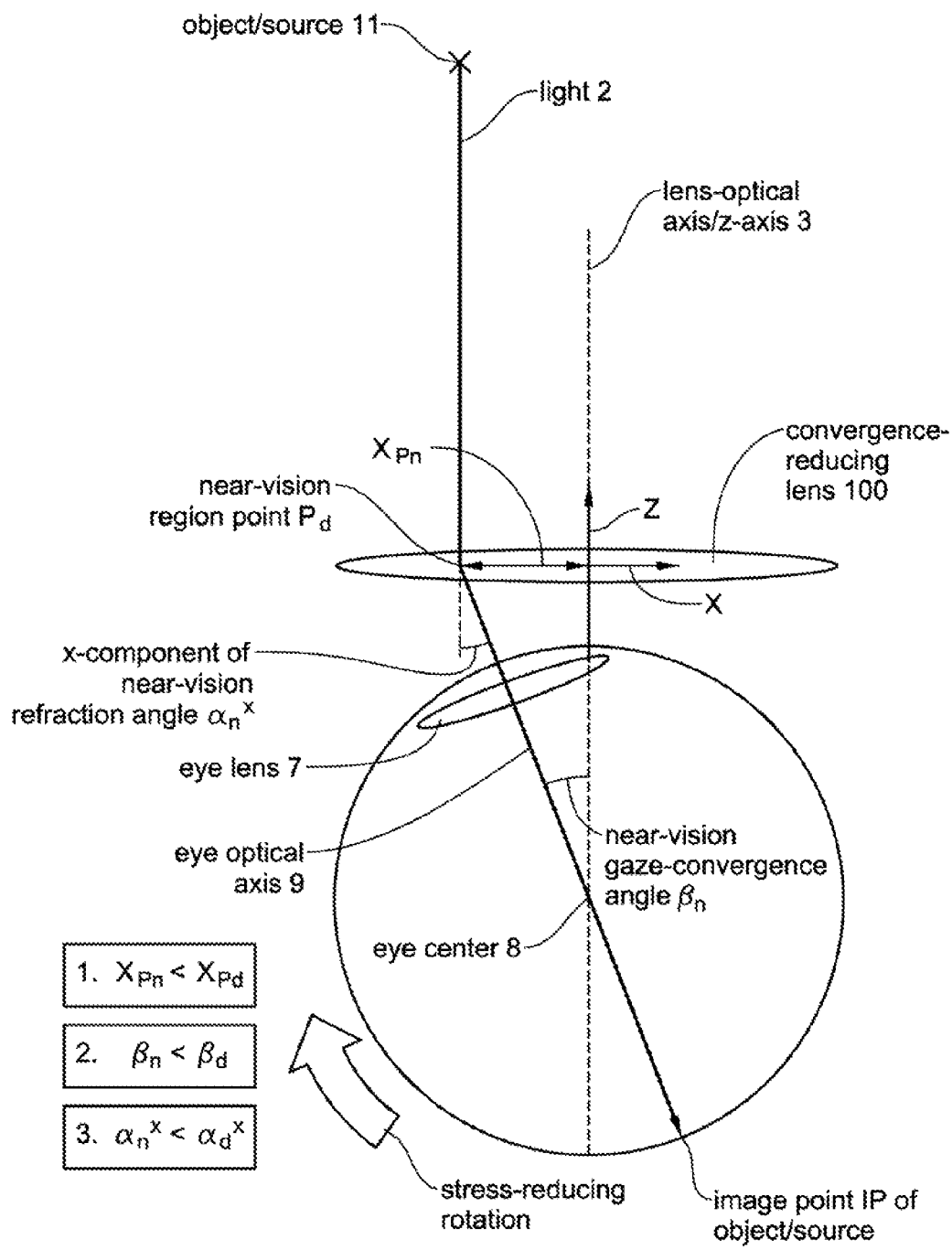

FIGS. 6A-B illustrate that in other embodiments, the object 11 can be farther away. For example, the source/object 11 can be located at a source x-distance from the z-axis 3 of the coordinate system that is smaller than a radius of the convergence-reducing lens 100; and at a source z-distance that is larger than 100 cm. A class of these objects-sources 11 can include light from a laser pointer, directed in parallel to the z-axis 3 at the near-vision region point $P_n$ and the distance-vision region point $P_d$. Embodiments of the convergence-reducing lens 100 satisfy at least one of three inequalities that are the analogs of the three inequalities of FIGS. 5A-B, as shown in the three boxes of FIG. 6B. The locations of the sources 11 are somewhat different in the embodiments of FIGS. 5A-B and FIGS. 6A-B, therefore the distance and angle ranges where the two sets of inequalities are satisfied may not be exactly equal. Nevertheless, the validity ranges of the inequalities largely overlap, and therefore, both sets of inequalities are representations of embodiments of the convergence-reducing lens 100.

Figure 5C:
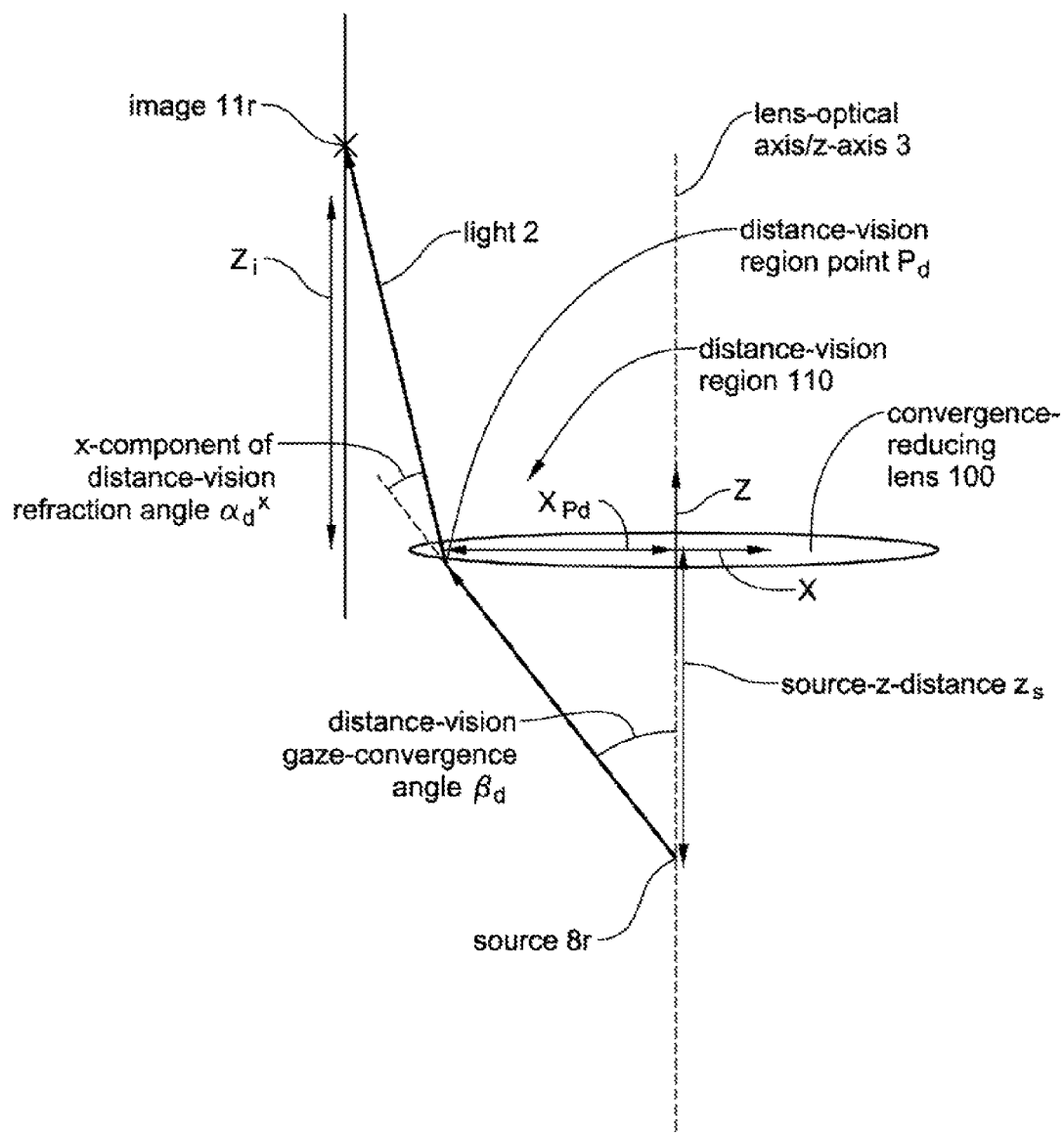
Figure 5D:
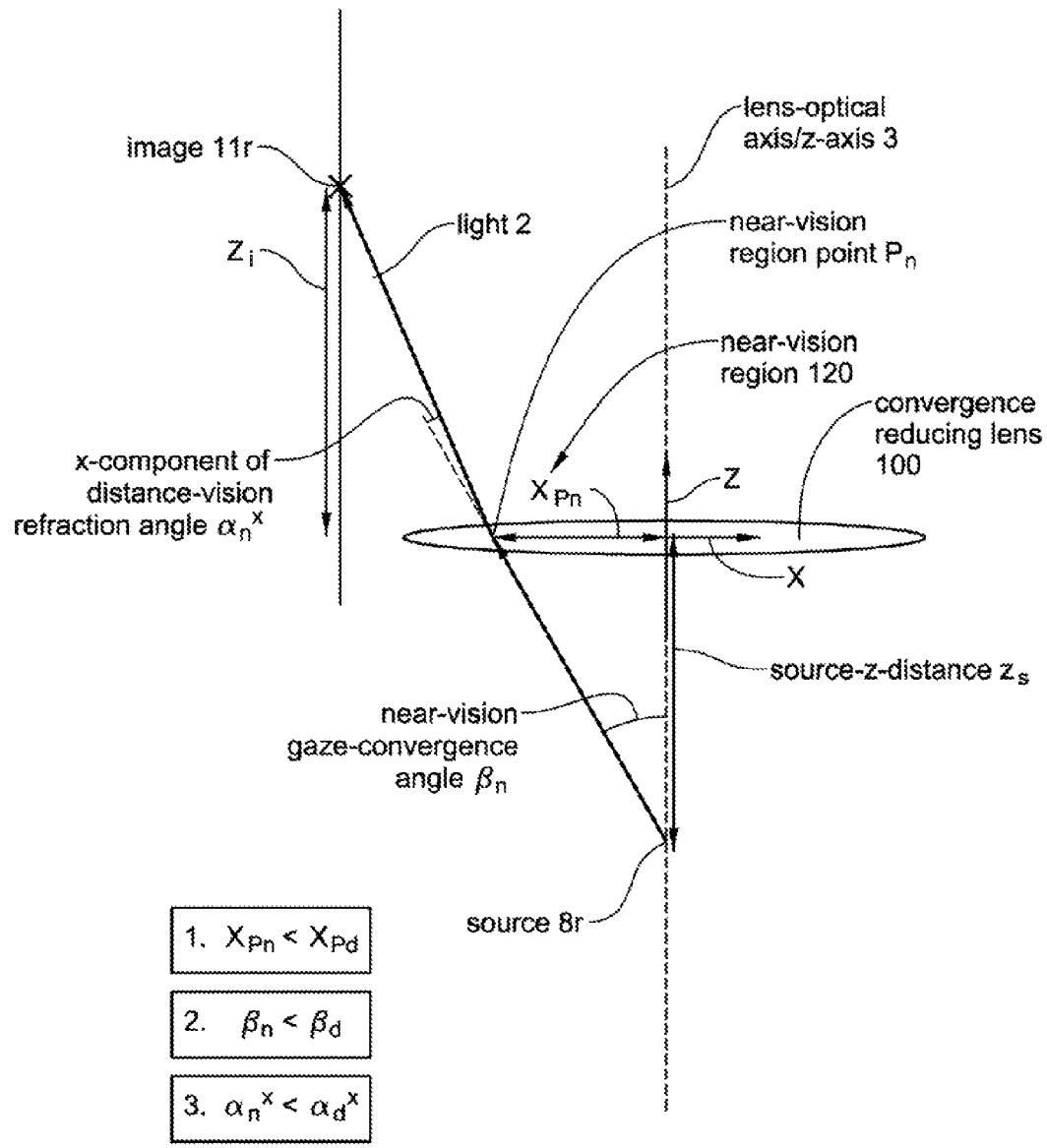

FIGS. 5C-D illustrate further aspects of the convergence-reducing lenses 100. The characterization of the embodiments of FIGS. 5C-D is largely analogous to that of FIGS. 5A-B, since the characterization is motivated by the reversibility of the paths of propagating light rays 2. To indicate that elements in FIGS. 5C-D are related to the elements in FIG. 5A-B by path-reversal, corresponding labels are used, with an "r" added, where appropriate. With these introductory considerations, some embodiments of a convergence-reducing lens 100 can have a distance-vision region 110, having a non-negative distance-vision optical power, that is configured to refract a light ray 2 directed by a source 8r at a distance-vision region point at a distance-vision x-distance $x_{Pd}$ from the center of the coordinate system, to propagate to an image point 11r, or object/source 11r. The image point $11r$, in some sense the reverse-pair of the object/source $11$ of the embodiments in FIGS. 5A-B, can be located at a z-distance $z_I$ from the x-y plane of the lens $100$. The source $8r$, in some sense the reverse-pair of the eye-center representative location $8$ of the embodiments in FIGS. 5A-B, can be located on the z-axis $3$ at a source-z-distance $z_s$ from a center of the coordinate system.

This embodiment of the convergence-reducing lens $100$ can further include a near-vision region $120$, having a near-vision optical power that matches the distance-vision optical power within 0.5 D, configured to refract a light ray $2$ directed by the source $8r$, located at the same source-z-distance $z_s$ from a center of the coordinate system, at a near-vision region point $P_n$ at a near-vision x-distance $x_{Pn}$ from the center of the coordinate system to propagate to the same image point $11r$. In these embodiments, the near-vision x-distance $x_{Pn}$ can be smaller than the distance-vision x-distance $x_{Pd}$, in analogy to inequality (4) of the embodiments of FIGS. 5A-B.

In some embodiments, the distance-vision region $110$ can be configured so that the source $8r$ can direct the light ray $2$ to propagate to the image point $11r$ via a refraction at the distance-vision region point $P_d$ by directing the light ray $2$ with a distance-vision gaze-convergence angle $\beta_d$ relative to a y-z plane of the coordinate system; and the near-vision region $120$ can be configured so that the source $8r$ can direct the light ray $2$ to propagate to the same image point $11r$ via a refraction at the near-vision region point $P_n$ by directing the light ray with a near-vision gaze-convergence angle $\beta_n$ relative to the y-z plane of the coordinate system. In these embodiments, the near-vision gaze-convergence angle $\beta_n$ can be smaller than the distance-vision gaze-convergence angle $\beta_d$, in analogy to inequality (5) above.

In some embodiments, the distance-vision region $110$ can be configured to refract the light ray $2$, directed by the source $8r$ at the distance-vision region point $P_d$ to propagate to the image point $11r$, by a distance-vision refraction angle $\alpha_d$. The near-vision region $120$ can be configured to refract the light ray $2$, directed by the source $8r$ at the near-vision region point $P_n$ to propagate to the same image point $11r$, by a near-vision refraction angle $\alpha_n$. In embodiments, $\alpha_n^x$, the x-component of the near-vision refraction angle $\alpha_n$ can be smaller than $\alpha_d^x$, the x-component of the distance-vision refraction angle, $\alpha_d$, in analogy to inequality (6) above.

Figure 8B:
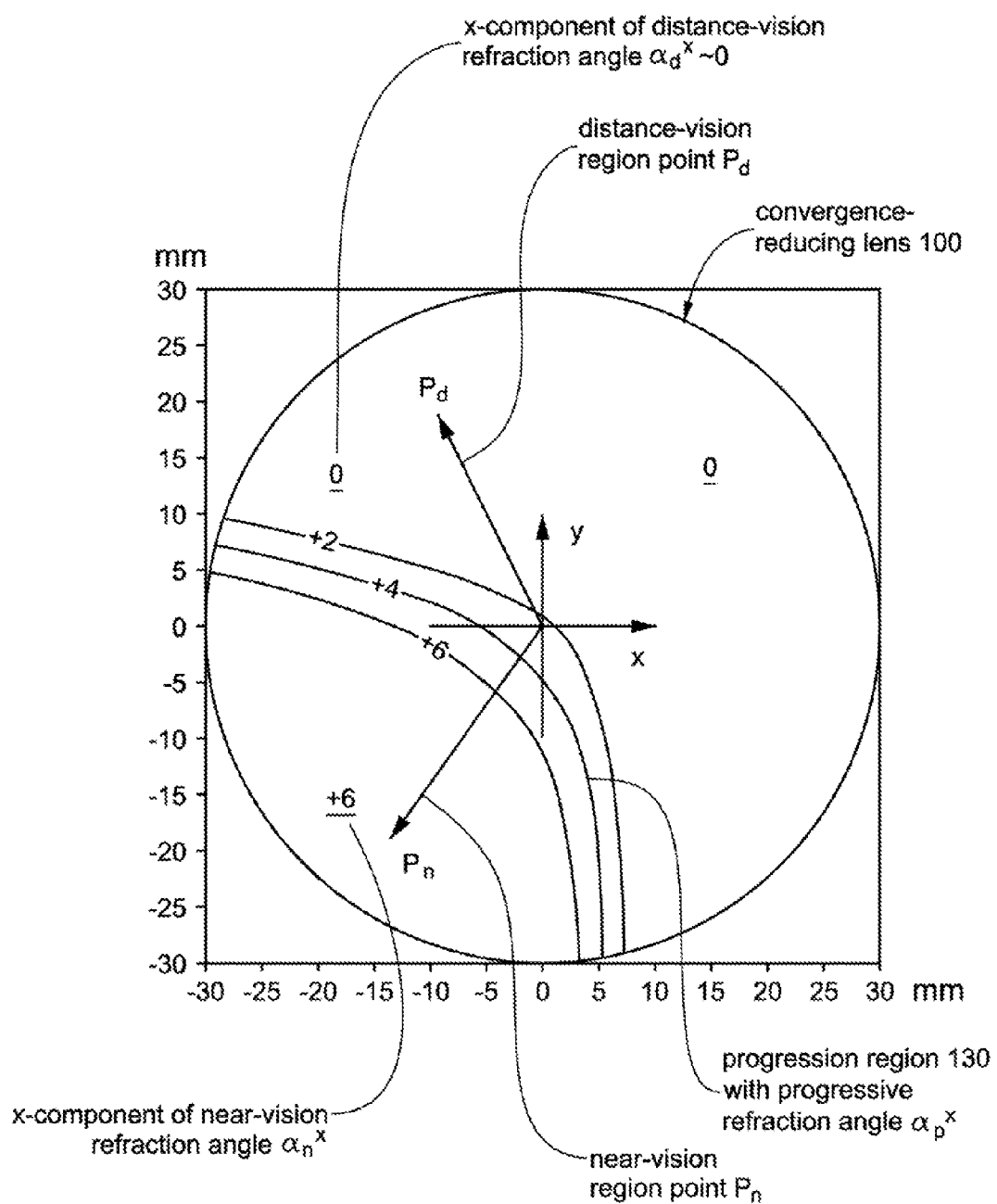

FIGS. 8A-B illustrate a frontal view of an embodiment of the convergence-reducing lens $100$, looking onto the x-y plane of the lens from the z-axis direction. FIG. 8A shows iso-dioptric contour lines of the optical power, whereas FIG. 8B shows iso-$\alpha^x$ refraction angle contour lines of the convergence-reducing lens $100$. In some embodiments of the convergence-reducing lens $100$, the distance-vision region $110$ can have a distance-vision optical power of D diopters. The near-vision region $120$ can have a near-vision optical power that matches the distance-vision optical power within 0.5 D; and a channel region $115$ that can connect the distance-vision region $110$ and the near-vision region $120$. In some embodiments, the near-vision optical power can match the distance-vision optical power within 0.25 D. Because of the close matching of the distance-vision optical power and the near-vision optical power, such embodiments can be called mono-vision lenses, single-vision lenses, or mono-focal lenses. The channel region $115$ can have an optical power that matches the distance-vision optical power and the near-vision optical power within 0.5 D. In designs, where the distance-vision optical power and the near-vision optical power are the same, the channel region optical power can also have this shared value. In designs, where the distance-vision optical power and the near-vision optical power differ by a small amount, such as by less than 0.5 D, the channel region optical power can smoothly interpolate between these near-equal optical powers.

As shown in FIG. 8A, in some embodiments, the distance-vision optical power and the near-vision optical power can be "near zero", such as less than 0.5 D. In some embodiments, the distance-vision and the near-vision optical power can be zero diopter, 0 D.

Such 0 D convergence-reducing lenses $100$ can be used by persons who do not need a correction of the optical power of their eyes, yet still feel a digitally caused strain on their eyes, a "digital eyestrain", that is caused by extended periods of gazing at near objects, such as digital, electronic, or computer screens. Such persons may decide to wear convergence-reducing spectacles $100'$ that reduce their digital eyestrain even if they do not need an optical power correction.

Embodiments of the convergence-reducing lens $100$ can further include a nasal transition region $135n$ and a temporal transition region $135t$. In these regions, the optical power may deviate from 0 D for reasons that are explained below.

In some embodiments, an area of the near-vision region $120$ can be larger than 5 mm$^2$. In some embodiments, the area of the near-vision region $120$ can be larger than 10 mm$^2$.

FIG. 8B illustrates that in some embodiments of the convergence-reducing lens $100$ with near 0 D optical power, $\alpha_d^x$, an x-component of the distance-vision refraction angle $\alpha_d$ in the distance-vision region $110$ can be near 0 as well, because $\alpha_d$ itself is near zero, based on Eqs. (2)-(3) and recalling that the optical power is 0 D. In these embodiments, $\alpha_n^x$, an x-component of the near-vision refraction angle $\alpha_n$ in the near-vision region $120$ can be positive. The magnitude of the refraction angles $\alpha$ was discussed previously. In many embodiments $\alpha^x$ can fall in the range of 0.5-50 arc minutes, in some embodiments in the range of 1-10 arc minutes. In FIG. 8B, $\alpha_n^x$=+6 arc minutes in the near-vision region $120$ as indicated by underlining the value.

These values are to be taken at the same x-distances from the center of the coordinate system for the distance-vision region $110$ and for the near-vision region $120$. This is shown by the near-vision region point $P_n$ being a reflection of the distance-vision region point $P_d$ across the x-axis, and thus having the same x-distance from the center of the coordinate system.

Finally, these lenses may include a progression region $130$, at least partially between the distance-vision region $110$ and the near-vision region $120$, wherein a light ray $2$, directed from the source $11$ at a progression region point at a progression x-distance is refracted to propagate to the eye-center representative location $8$, wherein the progression x-distance is between the near-vision x-distance $x_{Pn}$ and the distance-vision x-distance $x_{Pd}$. Such progression regions $130$ are also characterized by $\alpha_p^x$, an x-component of a progression refraction angle $\alpha_p$ that progresses between the x-components of the distance vision refraction angle $\alpha_d^x$ and the near-vision refraction angle $\alpha_n^x$. In the shown example, $\alpha_p^x$ progresses between $\alpha_d^x$=0 and $\alpha_n^x$=+6 arc minutes. It is noted that, at least in some embodiments, the progression region $130$ need not coincide with the channel region $115$ of FIG. 8A.

In FIG. 8A, the transition regions $135n$ and $135t$ can emerge for the following reason. In general, transition regions like the nasal transition region $135n$ and temporal transition region $135t$ are formed between the distance-vision region $110$ and the near-vision region $120$ when their optical properties are different in some aspect. This optical property can be their optical power, cylinder, or astigmatism. This difference in optical properties can lead to undesirable optical distortions. The transition regions 135n/t are designed to minimize these distortions. In the presently described convergence-reducing lenses 100, the optical power of the distance-vision region 110 and the near-vision region 120 can be close, or even the same.

Figure 9A:
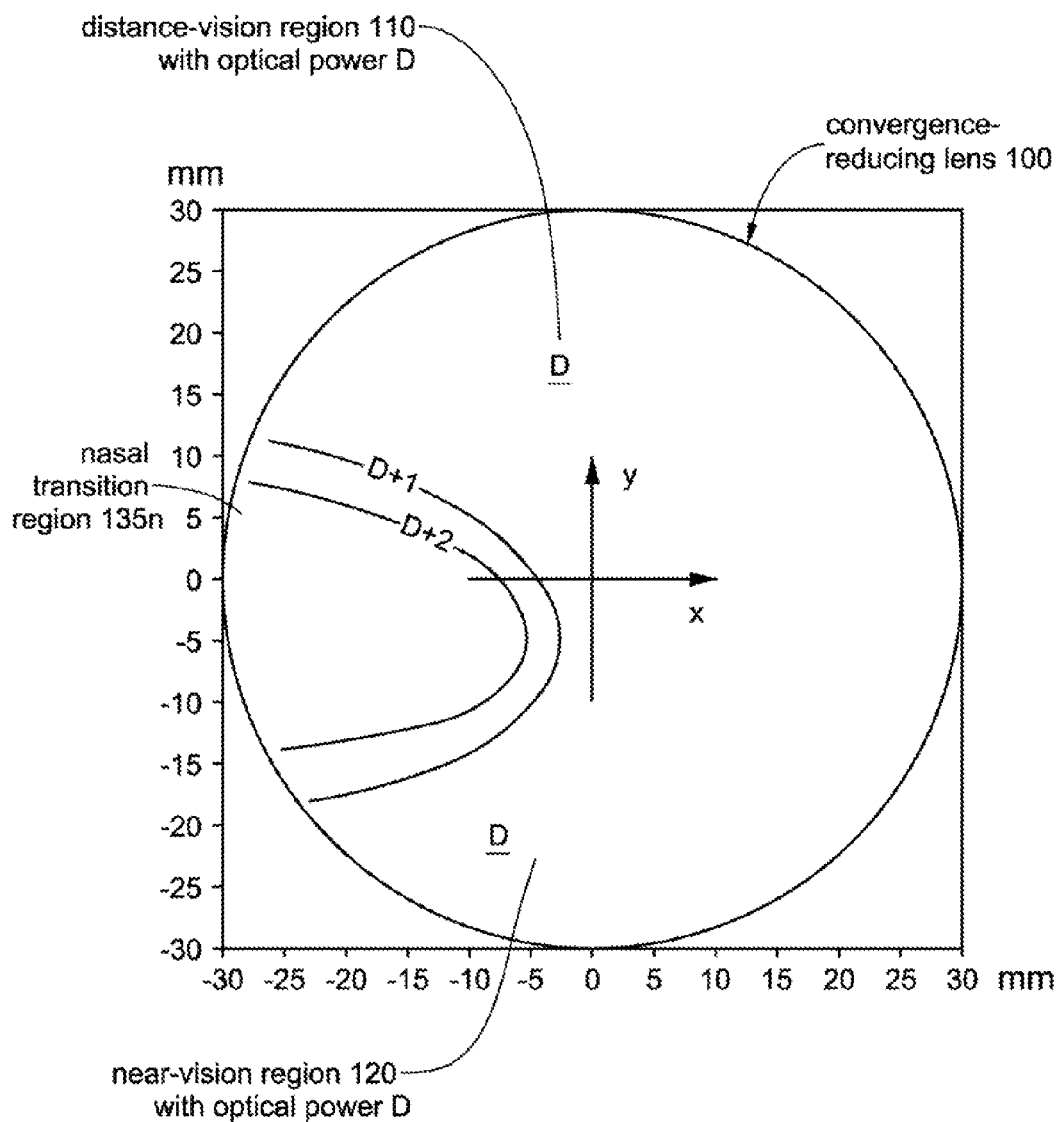
FIGS. 9A-D illustrate contour-representations of various convergence-reducing lenses for optical power D.

These convergence-reducing lenses 100, however, have different refraction angles $\alpha_d$ and $\alpha_n$ in the corresponding distance-vision region 110 and near-vision region 120. This difference may induce optical distortions. For this reason, it may reduce the optical distortions in these lenses 100, driven by the difference of the refraction angles $\alpha_d$ and $\alpha_n$, to include the transition regions 135n/t, and the progression region 130 to smoothly interpolate between the $\alpha_d$ and the $\alpha_n$ refraction regions. FIG. 9A shows that in some embodiments, only a nasal transition region 135n may suffice for this purpose.

FIG. 8B shows that in some embodiments, the majority of the near-vision region 120 can occupy the lower, or inferior nasal quadrant of the lens 100. In some embodiments, the near-vision region 120 can extend to the lower temporal quadrant, as shown.

Figure 8C:
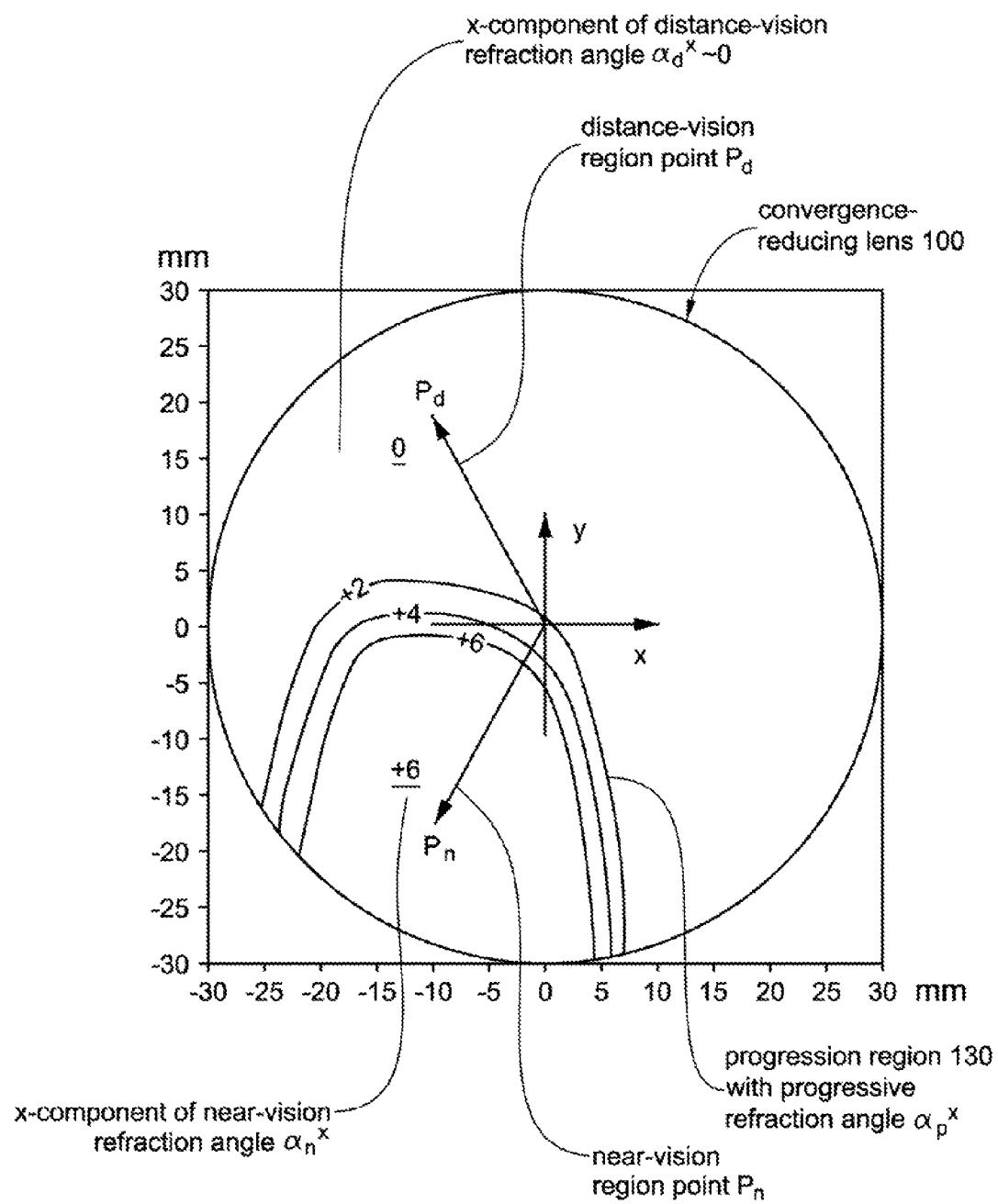

FIG. 8C shows that in some embodiments, the near-vision region 120 may fill even the lower nasal quadrant only partially.

Figure 9B:
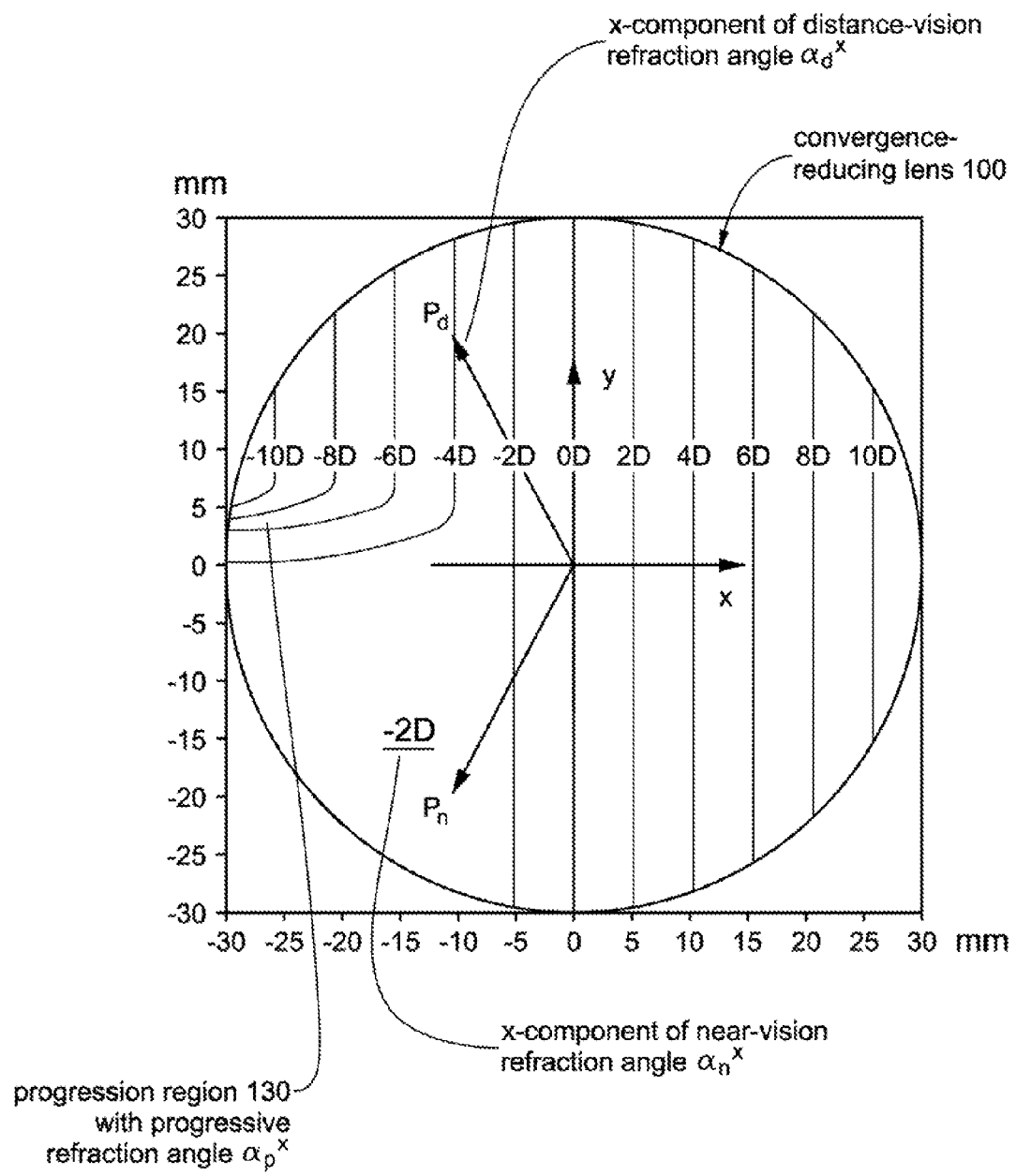
Figure 9C:
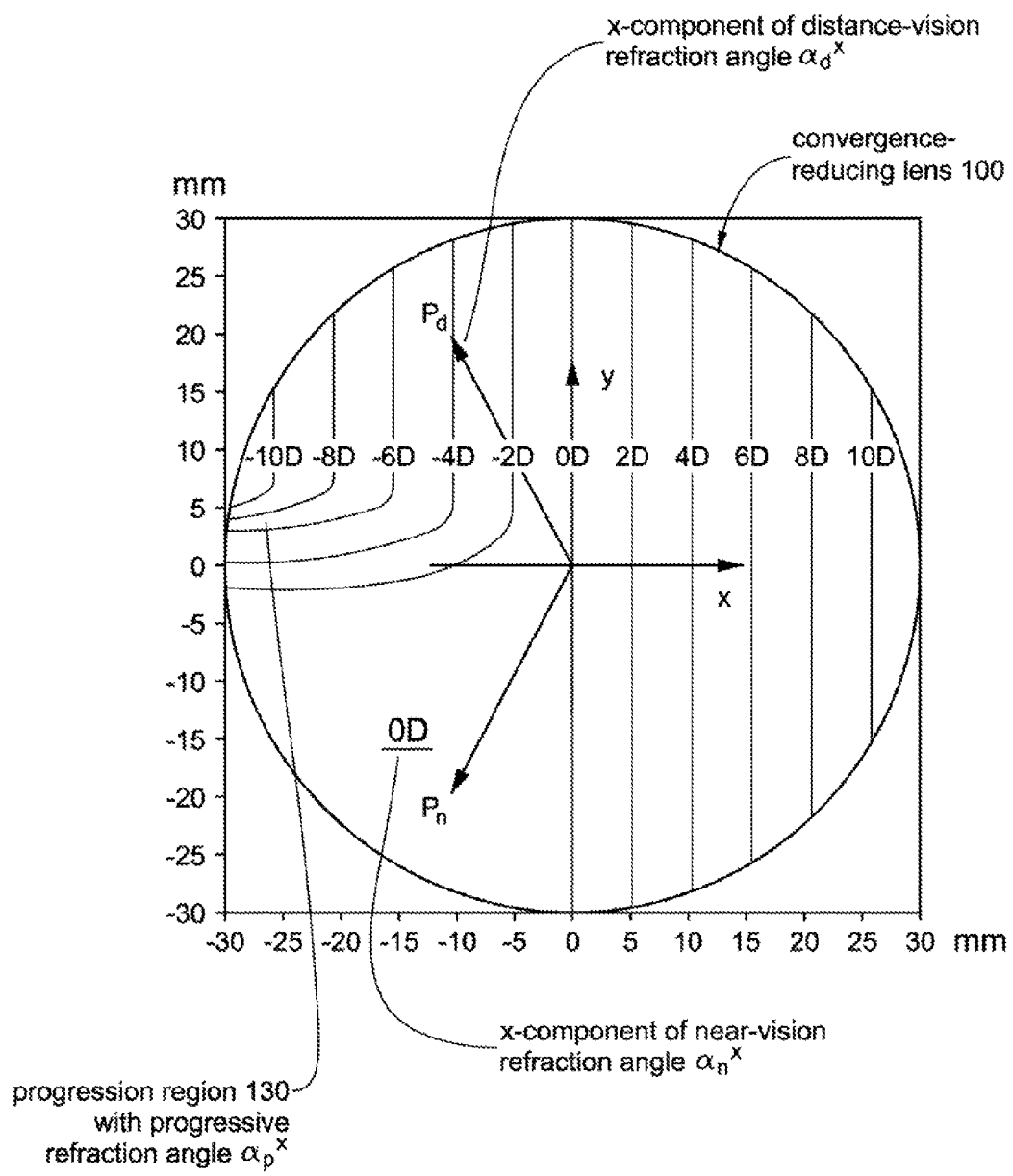
Figure 9D:
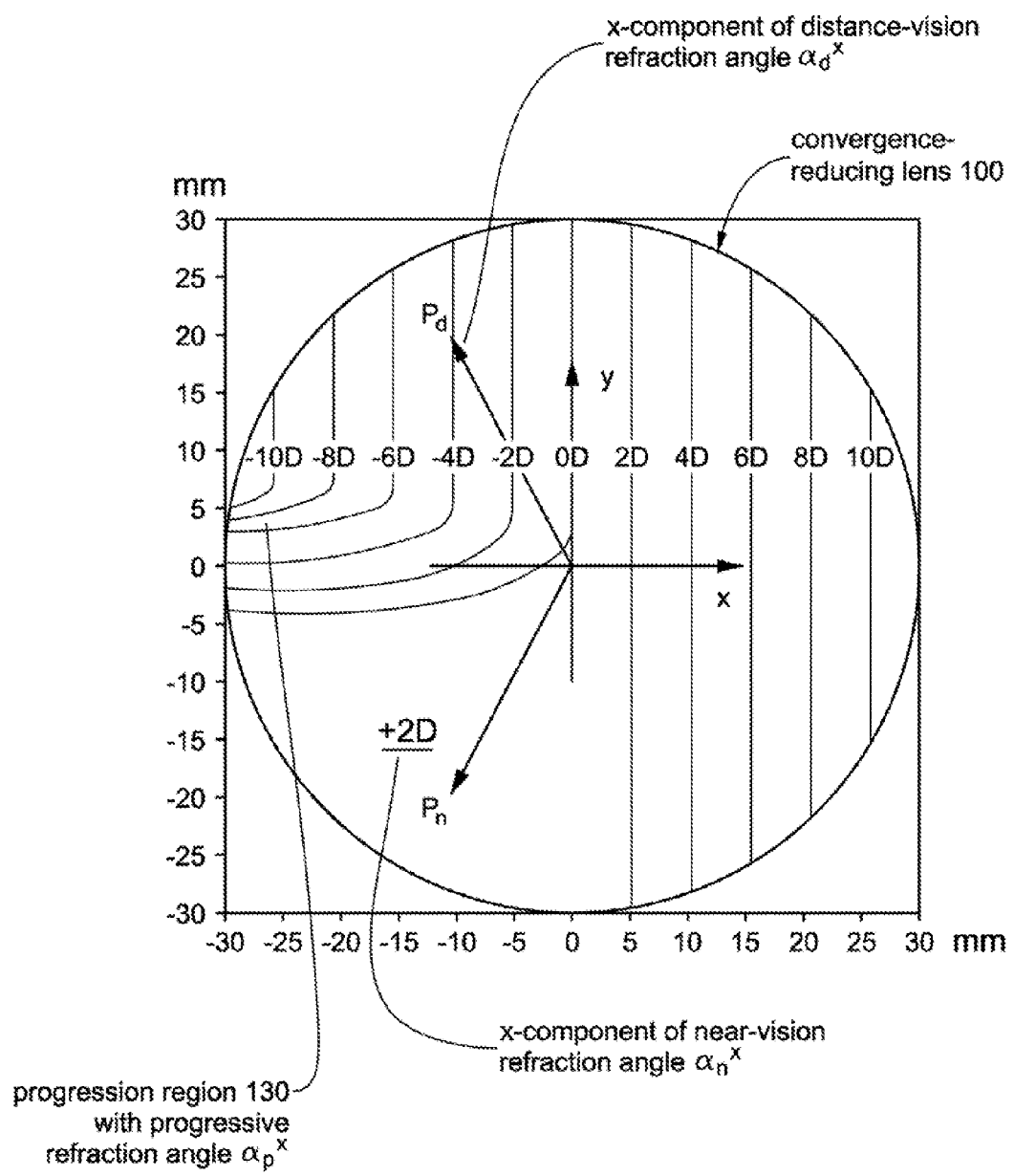

FIG. 9A shows a convergence-reducing lens 100 that has an optical power D. FIGS. 9B-D show the iso-$\alpha^x$ contours for various embodiments of the convergence-reducing lens 100 of FIG. 9A. As discussed in relation to FIG. 2C, in lenses with a fixed optical power, the iso-$\alpha^x$ contours may be vertical lines.

FIG. 9B illustrates an embodiment of lens 100 where the near-vision region 120 fills out the lower nasal quadrant only partially. FIG. 9C illustrates an embodiment of lens 100 where the near-vision region 120 fills out the lower nasal quadrant fully. FIG. 9D illustrates an embodiment of the lens 100 where the near-vision region 120 fills out the lower nasal quadrant and also extends into the lower temporal quadrant.

FIGS. 9B-D also illustrate that embodiments of the convergence-reducing lens 100 can compensate and reduce the refraction by the positive optical power distance-vision region 110 so well in the near-vision region 120 that the negative x-component of the distance-vision refraction angle $\alpha_d^x$ can be compensated into a smaller-magnitude negative $\alpha_n^x$ in FIG. 9B, a zero $\alpha_n^x$ in FIG. 9C, or even into an overcompensated, opposite sign, positive $\alpha_n^x$ in FIG. 9D. Such an overcompensated case was already illustrated with the light rays of FIG. 4B, with a refraction angle of the opposite sign than in FIG. 4A.

In the special case when the optical power of the distance-vision region 110 is approximately zero, $\alpha_d^x$ is accordingly small or zero. In such cases, the near-vision region can compensate a near-zero x-component of the distance-vision refraction angle $\alpha_d^x$ into a positive $\alpha_n^x$.

Figure 10A:
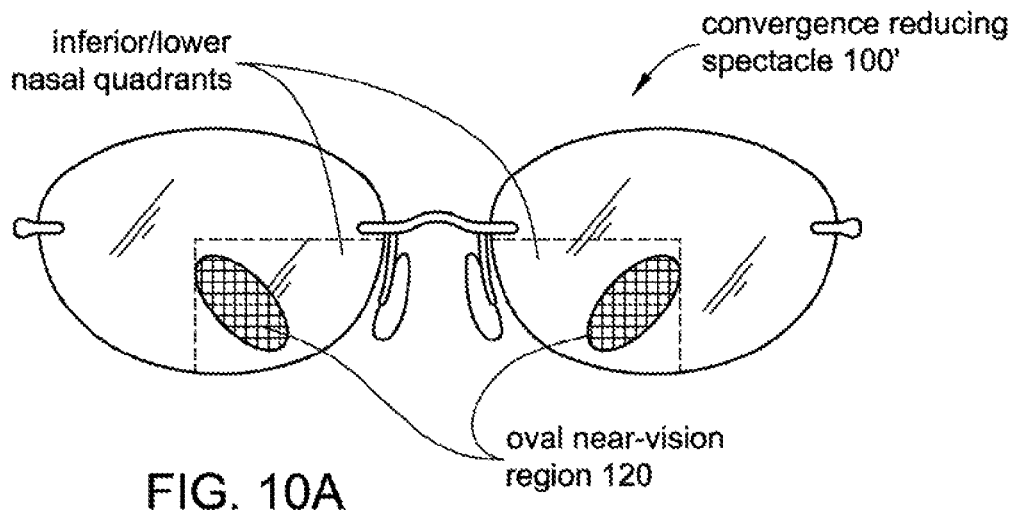
FIGS. 10A-C illustrate various designs of the near-vision region.
Figure 10B:
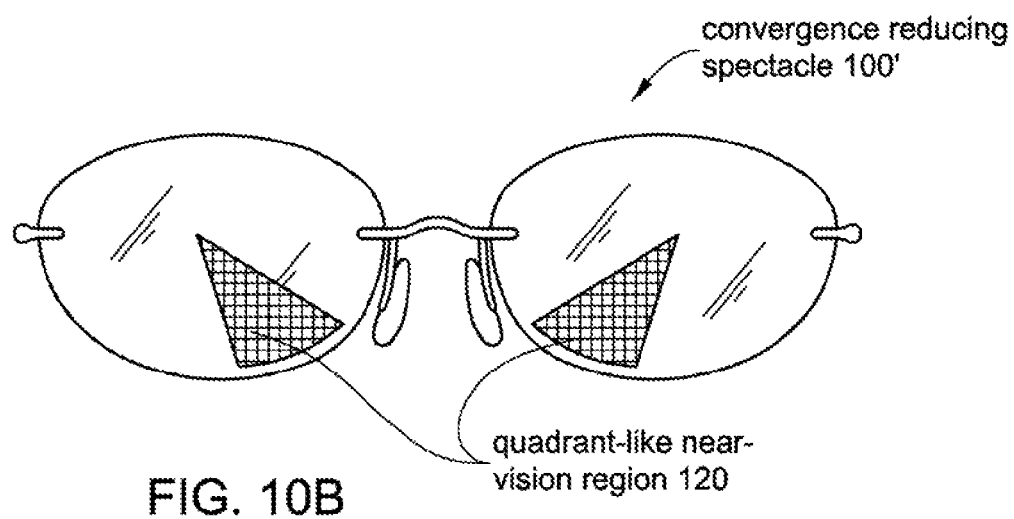
Figure 10C:
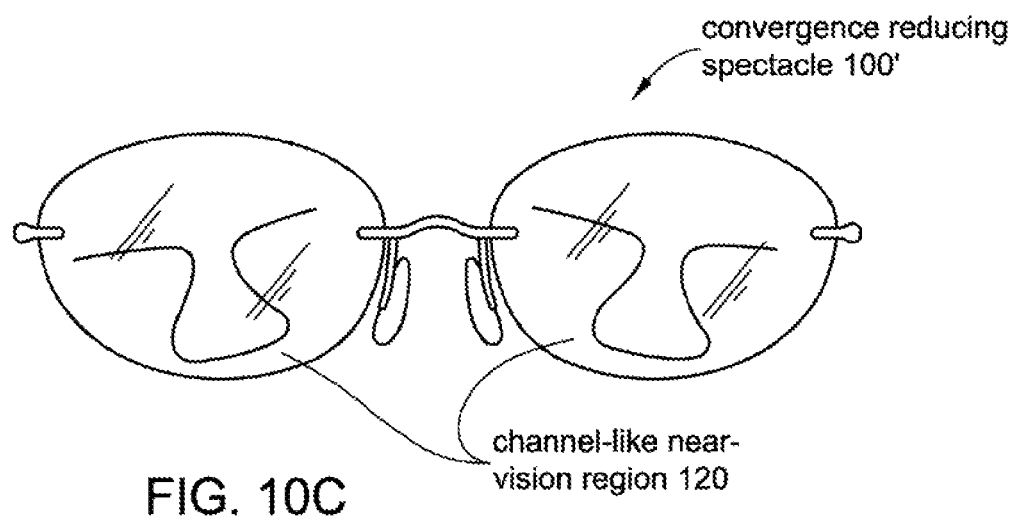

FIGS. 10A-C illustrate that the near-vision region 120 can have different shapes, including an oval, a quadrant, a triangle, a rectangle, an elongated region, a diagonal region, a channel or a corridor.

Figure 11A:
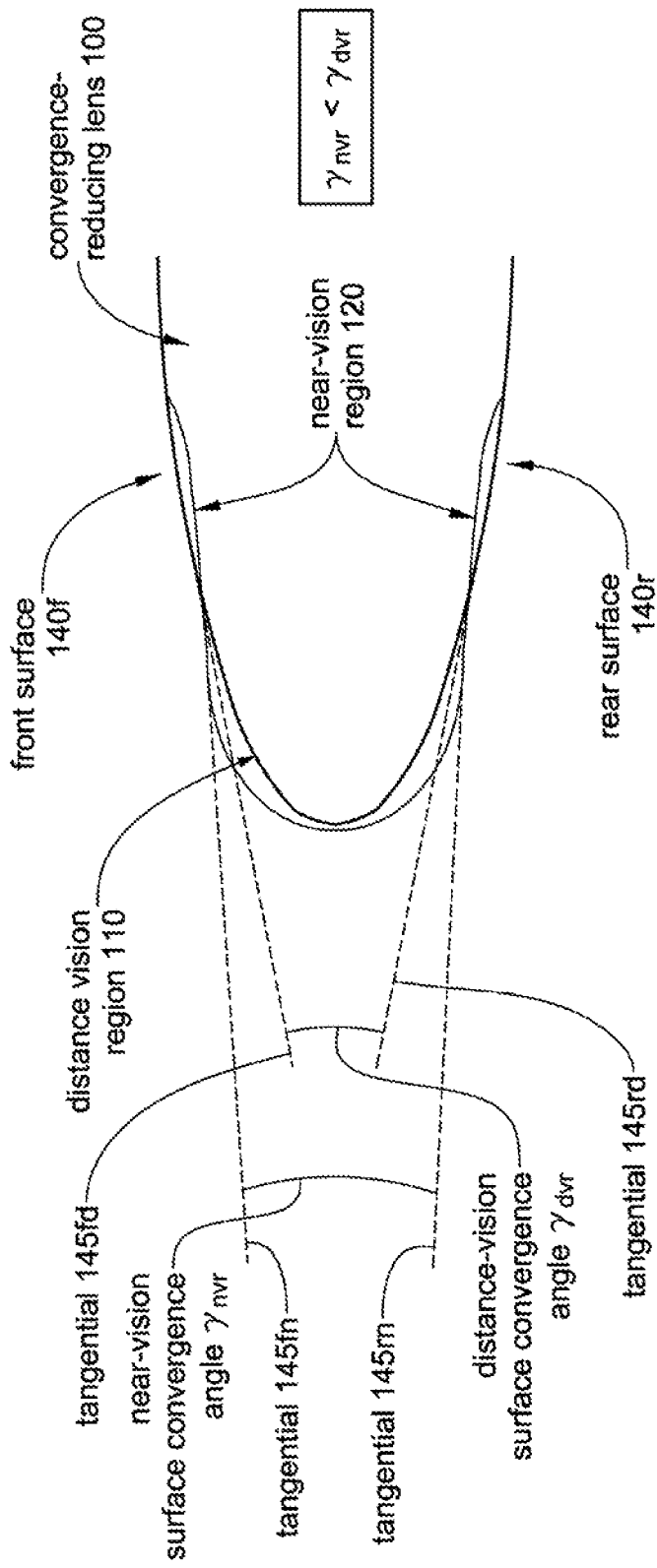
FIGS. 11A-B illustrate lens designs.
Figure 11B:
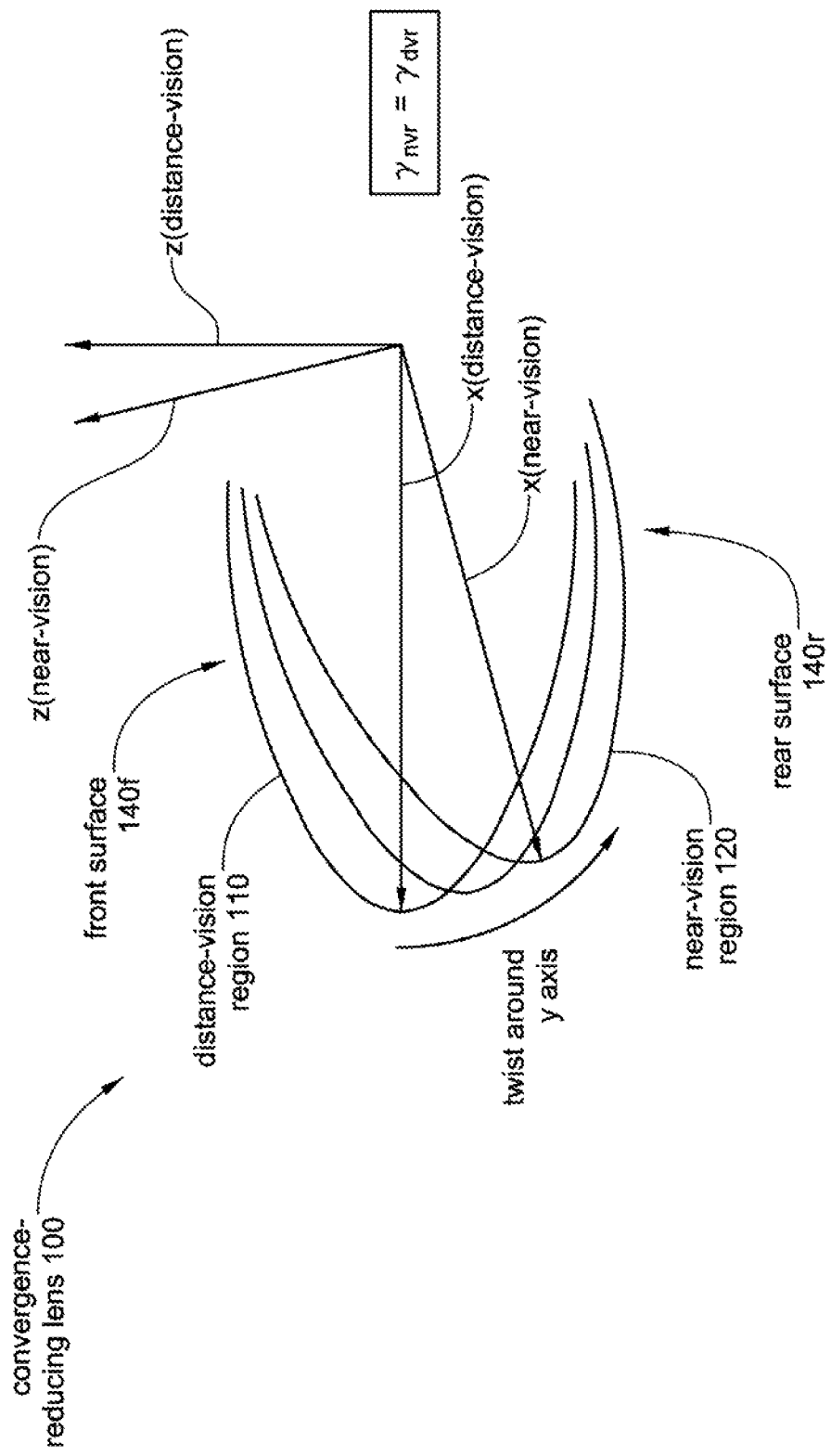

FIGS. 11A-B illustrate two embodiments of the convergence-reducing lens 100 that can achieve and deliver the above described properties of the convergence-reducing lens 100, in particular, that show configurations and designs of lenses 100 that satisfy at least one of the earlier described three inequalities (4)-(6).

FIG. 11A illustrates that embodiments of the convergence-reducing lens 100 can include a front surface 140f, with a distance-vision front-tangential 145fd at an x-distance from the center of the coordinate system, and a near-vision front-tangential 145fn at the same x-distance; and further they can include a rear surface 140r, with a distance-vision rear-tangential 145rd at the same x-distance, and a near-vision rear-tangential 145rn at the same x-distance. These tangentials 145 are indicated by dashed lines. The distance-vision front-tangential 145fd and the distance-vision rear-tangential 145rd form a distance-vision surface convergence angle $\gamma_{dvr}$, while the near-vision front-tangential 145fn and the near-vision rear-tangential 145rn make a near-vision surface convergence angle $\gamma_{nvr}$. In FIG. 11A, the front and rear surfaces 140f and 140r of the near-vision region 120 are the indented surfaces close to the center of the lens 100, and therefore the near-vision surface convergence angle $\gamma_{nvr}$ is smaller than the distance-vision surface convergence angle $\gamma_{dvr}$:

$$\gamma_{nvr} < \gamma_{dvr}. \qquad (7)$$

This inequality is one way to design a convergence-reducing lens 100 that achieves at least one of the three inequalities (4)-(6). Several designs can be consistent with this inequality. In some cases, the inequality of the angles in Eq. (7) can be solely driven by one of the tangentials being different, and the tangential of the other surface being the same for the front and rear surfaces. In some cases, the lens 100 can be a meniscus lens 100. It is also noted that these angles $\gamma_{nvr}$ and $\gamma_{dvr}$ depend on the x-distance where the tangentials were fitted to the surfaces 140r and 140f: $\gamma_{nvr}=\gamma_{nvr}(x)$, and $\gamma_{dvr}=\gamma_{dvr}(x)$. The angles $\gamma_{nvr}(x)$ and $\gamma_{dvr}(x)$ are to be determined and compared at the same x-distances from the center.

FIG. 11B shows another lens design to create a lens 100 that achieves at least one of the three inequalities (4)-(6) in another manner. In this design:

$$\gamma_{nvr} = \gamma_{dvr}. \qquad (8)$$

Instead of modifying the surface tangentials, in these embodiments the distance-vision region 110 has a distance-vision z-axis; the near-vision region 120 has a near-vision z-axis, and the near-vision z-axis is rotated, or twisted in a nasal direction relative to the distance-vision z-axis. The twist is illustrated from looking down on the lens from the +y axis direction. The distance-vision z-axis at the highest y levels of the lens 100 where the distance-vision region 120 is naturally located, can be essentially parallel to the overall lens z-axis 3. Progressing towards lower y levels, where the near-vision region 120 is naturally located, the x-y plane of the lens is getting rotated so that the z-axis is rotated in the nasal direction. Two of the twisted cross sections are shown in FIG. 11B. The middle cross section may correspond to the progression region 130, and the bottom, most twisted cross section can correspond to the near-vision region 120, with its twisted near-vision z-axis.

It is noted that a manufacturing process of the embodiment of FIG. 11B may be remarkably easy as the process may involve forming a lens with the desired optical powers and then warming the lens until its material softens to a degree that allows a twisting of the lens by the designed amount.

Figure 7A:
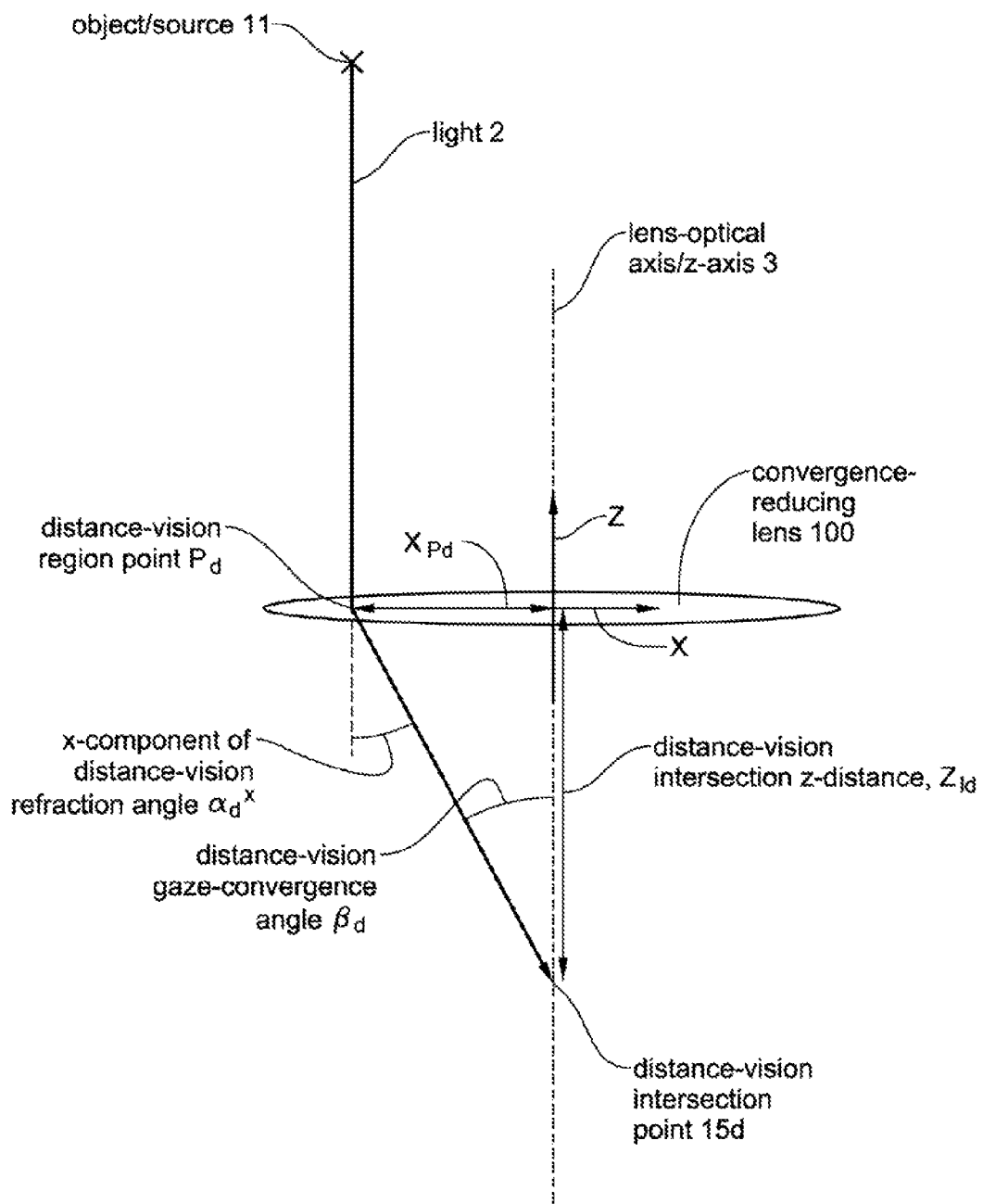
FIGS. 7A-D illustrate embodiments of a convergence-reducing lens.

Next, the embodiments of FIGS. 7A-D will be described. FIG. 7A shows that embodiments of the convergence-reducing lens 100 can include a distance-vision region 110, having a non-negative distance-vision optical power, that is configured to refract a light ray 2, directed parallel to the z-axis 3 at a distance-vision region point $P_d$ at an x-distance from a y-z plane of the coordinate system $x_{Pd}$, to intersect the y-z-plane at a distance-vision intersection z-distance $z_{Id}$. The convergence-reducing lens 100 can also include a near-vision region 120, having a near-vision optical power that matches the distance-vision optical power within 0.5 D, that is configured to refract a light ray 2, directed parallel to the z-axis 3 at a near-vision region point $P_n$, at an x-distance $x_{Pn}$ that is equal to the distance-vision region point $P_d$: $x_{Pn}=x_{Pd}$, to intersect the y-z-plane at a near-vision intersection z-distance $z_{In}$ that is greater than the distance-vision intersection z-distance:

$$z_{In} > z_{Id}. \quad (9)$$

In some embodiments of the convergence-reducing lens 100, the distance-vision region 110 can be configured to refract the light ray 2, directed parallel to the z-axis 3 at the distance-vision region point $P_d$ at the x-distance $x_{Pd}$, by a distance-vision refraction angle $\alpha_d$. The near-vision region 120 can be configured to refract the light ray 2, directed parallel to the z-axis 3 at the near-vision region point $P_n$ at the x-distance $x_{Pn}$, by a near-vision refraction angle $\alpha_n$. In embodiments, $\alpha_n^x$, an x-component of the near-vision refraction angle $\alpha_n$ can be smaller than $\alpha_d^x$, an x-component of the distance-vision refraction angle $\alpha_d$ that corresponds to the same x-distance $x_{Pn}=x_{Pd}$:

$$\alpha_n^x < \alpha_d^x. \quad (10)$$

In some embodiments of the convergence-reducing lens 100, the distance-vision region 110 can be configured to refract the light ray 2, directed parallel to the z-axis 3 at the distance-vision region point $P_d$ at the x-distance $x_{Pd}$, to intersect the y-z plane with a distance-vision gaze-convergence angle $\beta_d$: the near-vision region 120 can be configured to refract the light ray 2 directed parallel to the z-axis 3 at the near-vision region point $P_n$ at the same x-distance $x_{Pn}=x_{Pd}$, to intersect the y-z plane with a near-vision gaze-convergence angle $\beta_n$. In embodiments, the near-vision gaze-convergence angle $\beta_n$ can be smaller than the distance-vision gaze-convergence angle $\beta_d$ that corresponds to the same x-distance:

$$\beta_n < \beta_d. \quad (11)$$

Figure 7B:
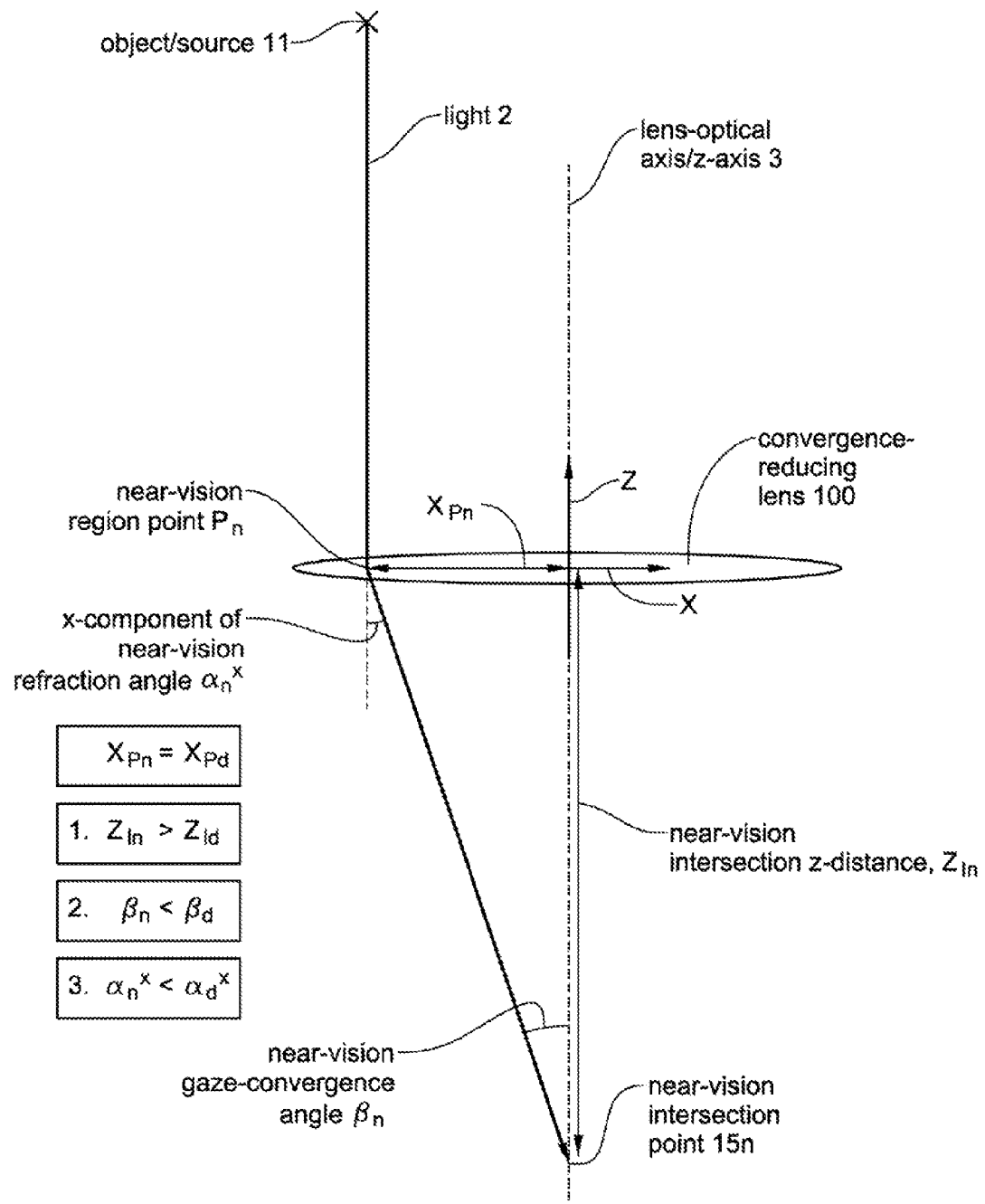

The inequalities (9)-(11) characterize the embodiments of FIGS. 7A-B similarly to the inequalities (4)-(6) characterizing the embodiments of FIGS. 5A-B and FIGS. 6A-B. Embodiments of the convergence-reducing lens 100 satisfy at least one of the three inequalities (9)-(11).

As before, embodiments of the convergence-reducing lens 100 can further include a progression region 130, at least partially between the distance-vision region 110 and the near-vision region 120, that is configured to refract a light ray 2, directed parallel to the z-axis 3 at a progression region point $P_p$ at the x-distance $x_{Pp}$ that is the same as of the distance-vision region point $x_{Pp}=x_{Pn}=x_{Pd}$, to intersect the y-z-plane at a progression intersection z-distance $z_{Ip}$ that is between the near-vision intersection z-distance $z_{In}$ and the distance-vision intersection z-distance $z_{Id}$: $z_{Id} < z_{Ip} < z_{In}$.

Figure 7C:
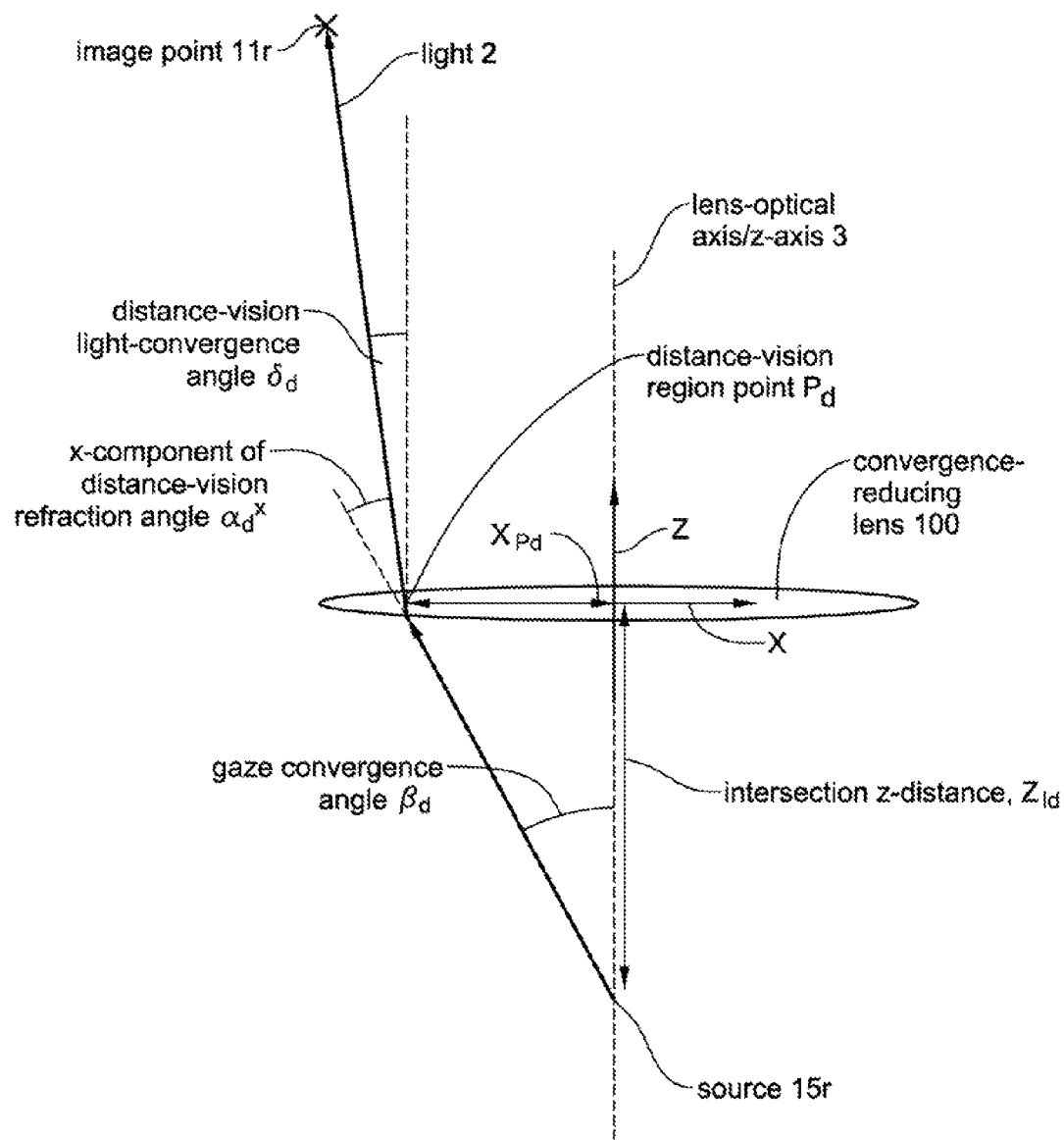
Figure 7D:
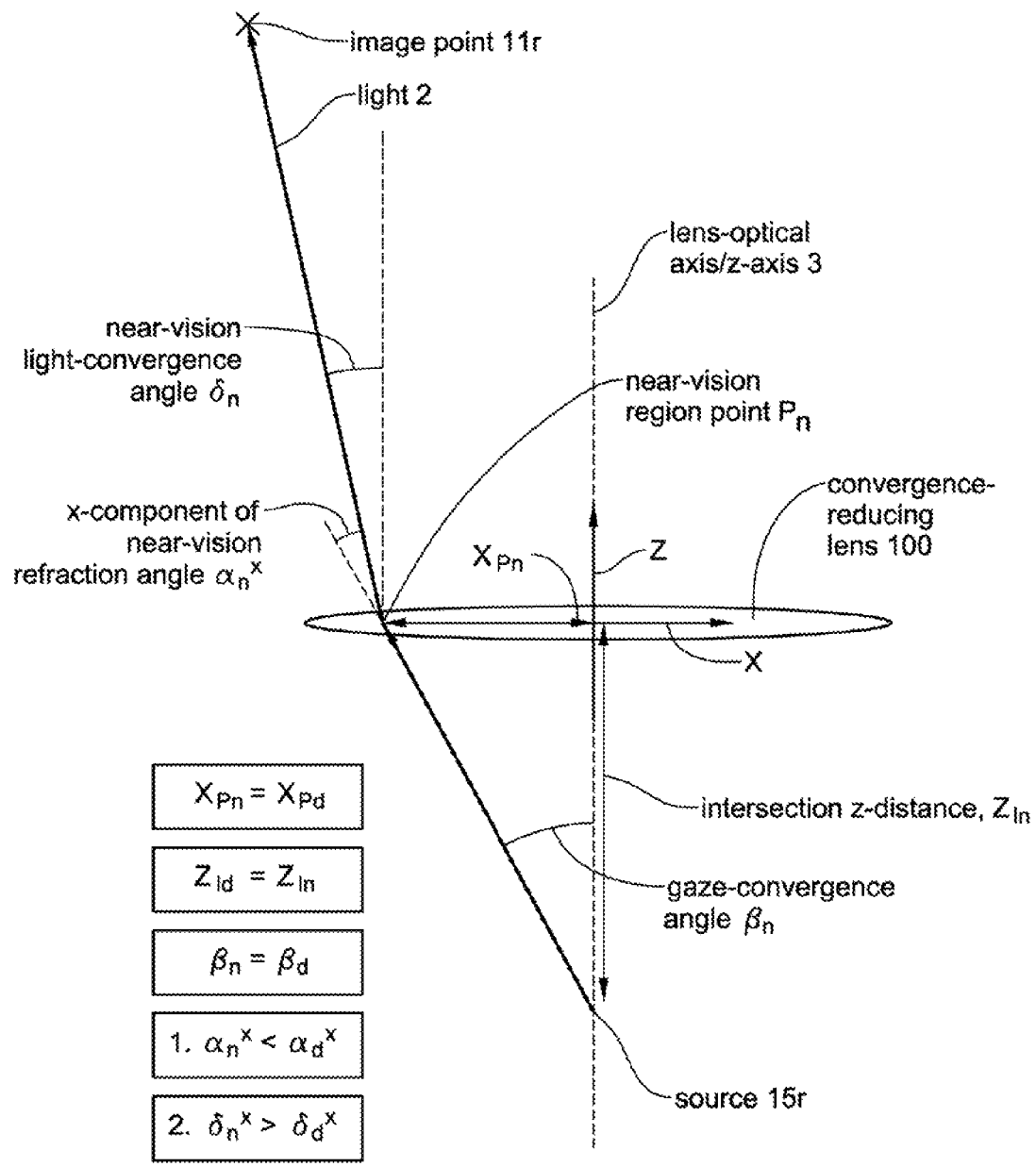

FIGS. 7C-D describe embodiments that are related to reversing the path of the light rays 2 in the embodiments of FIGS. 7A-B, albeit with some necessary adaptations. FIG. 7C illustrates that embodiments of the convergence-reducing lens 100 can include a distance-vision region 110, having a non-negative distance-vision optical power, configured to refract a light ray 2, directed by a source 15r at a distance-vision region point $P_d$ at an x-distance $x_{Pd}$ from a y-z plane of the coordinate system, to make a distance-vision light-convergence angle $\delta_d$ with the y-z-plane, wherein the source 15r is located on the z-axis 3 at an intersection z-distance $z_{Id}$ from a center of the coordinate system. The lens 100 can further include a near-vision region 120, having a near-vision optical power that matches the distance-vision optical power within 0.5 D, that is configured to refract a light ray 2, directed by the source 15r at a near-vision region point $P_n$ at the same x-distance $x_{Pn}$ from the y-z plane of the coordinate system as that of the distance-vision point $P_d$: $x_{Pn}=x_{Pd}$, to make a near-vision light-convergence angle $\delta_n$ with the y-z-plane. Here the source 15r can be at the intersection z-distance $z_{In}$ that is again the same as the source 15r for the distance-vision $z_{Id}$: $z_{In}=z_{Id}$. In such embodiments, $\delta_n^x$, an x-component of the near-vision light-convergence angle $\delta_n$ can be greater than $\delta_d^x$, an x-component of the distance-vision light-convergence angle $\delta_d$:

$$\delta_n^x > \delta_d^x. \quad (12)$$

In some embodiments of the lens 100, the distance-vision region 110 can be configured to refract the light ray 2, directed by the source 15r at the distance-vision region point $P_d$ at $x_{Pd}$, the x-distance from the y-z plane of the coordinate system, by a distance-vision refraction angle $\alpha_d$. Further, the near-vision region 120 can be configured to refract a light ray 2, directed by the source 15r at the near-vision region point $P_n$ at $x_{Pn}$, the x-distance from the y-z plane of the coordinate system, by a near-vision refraction angle $\alpha_n$. In embodiments, $\alpha_n^x$, an x-component of the near-vision refraction angle $\alpha_n$ can be smaller than $\alpha_d^x$, an x-component of the distance-vision refraction angle $\alpha_d$:

$$\alpha_n^x < \alpha_d^x. \quad (13)$$

Inequalities (12)-(13) characterize the embodiments of FIGS. 7C-D analogously to inequalities (4)-(6) characterizing the embodiments of FIGS. 5C-D, and inequalities (9)-(11) characterizing the embodiments of FIGS. 7A-B.

Several additional characteristics of the embodiments of FIGS. 5A-D and FIGS. 6A-B were described earlier. These characteristics can also apply to, or combined with, the embodiments of FIGS. 7A-D.

Figure 12A:
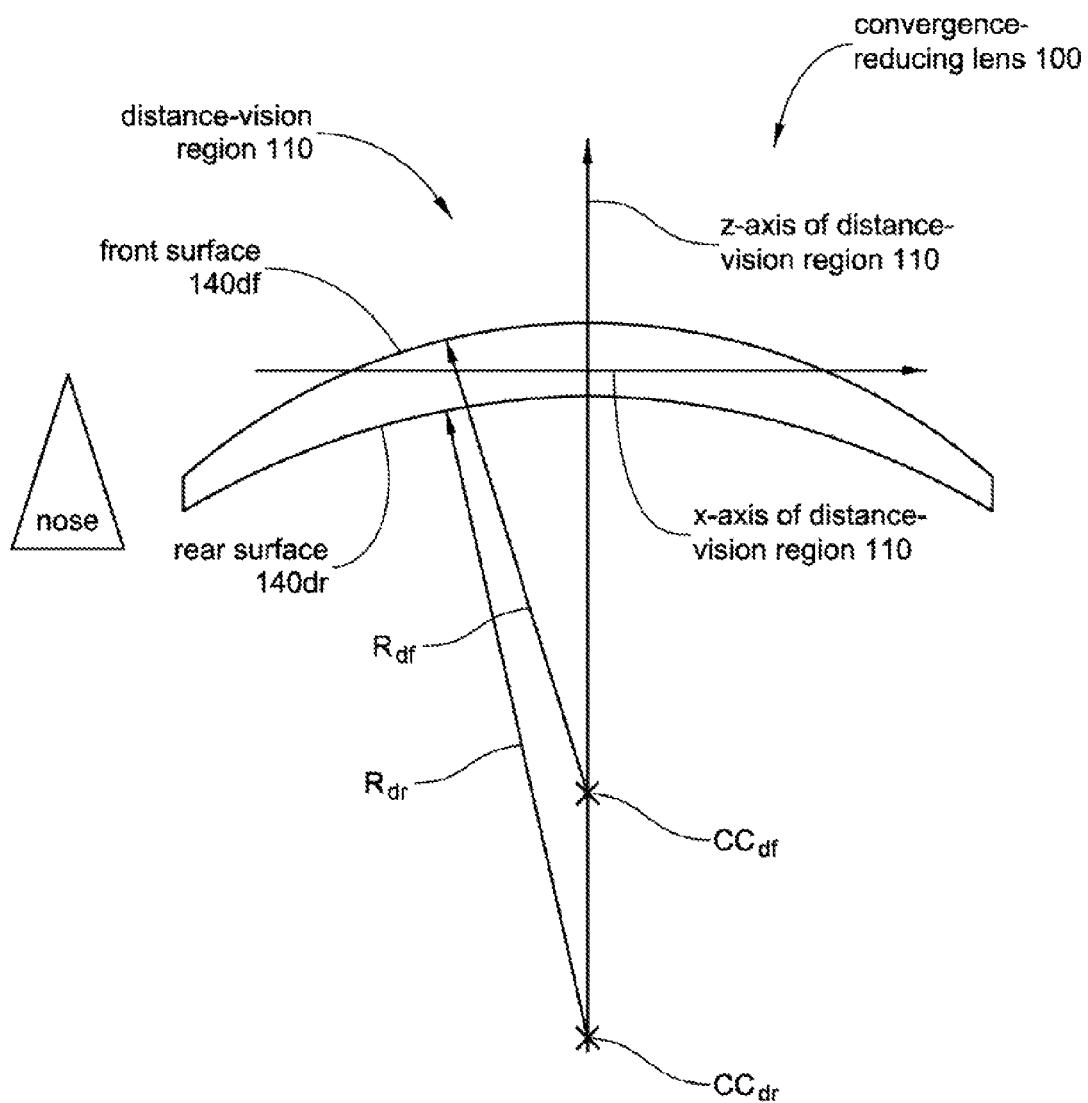
FIGS. 12A-B illustrate off-axis centers of curvatures in various embodiments of the convergence-reducing lens.
Figure 12B:
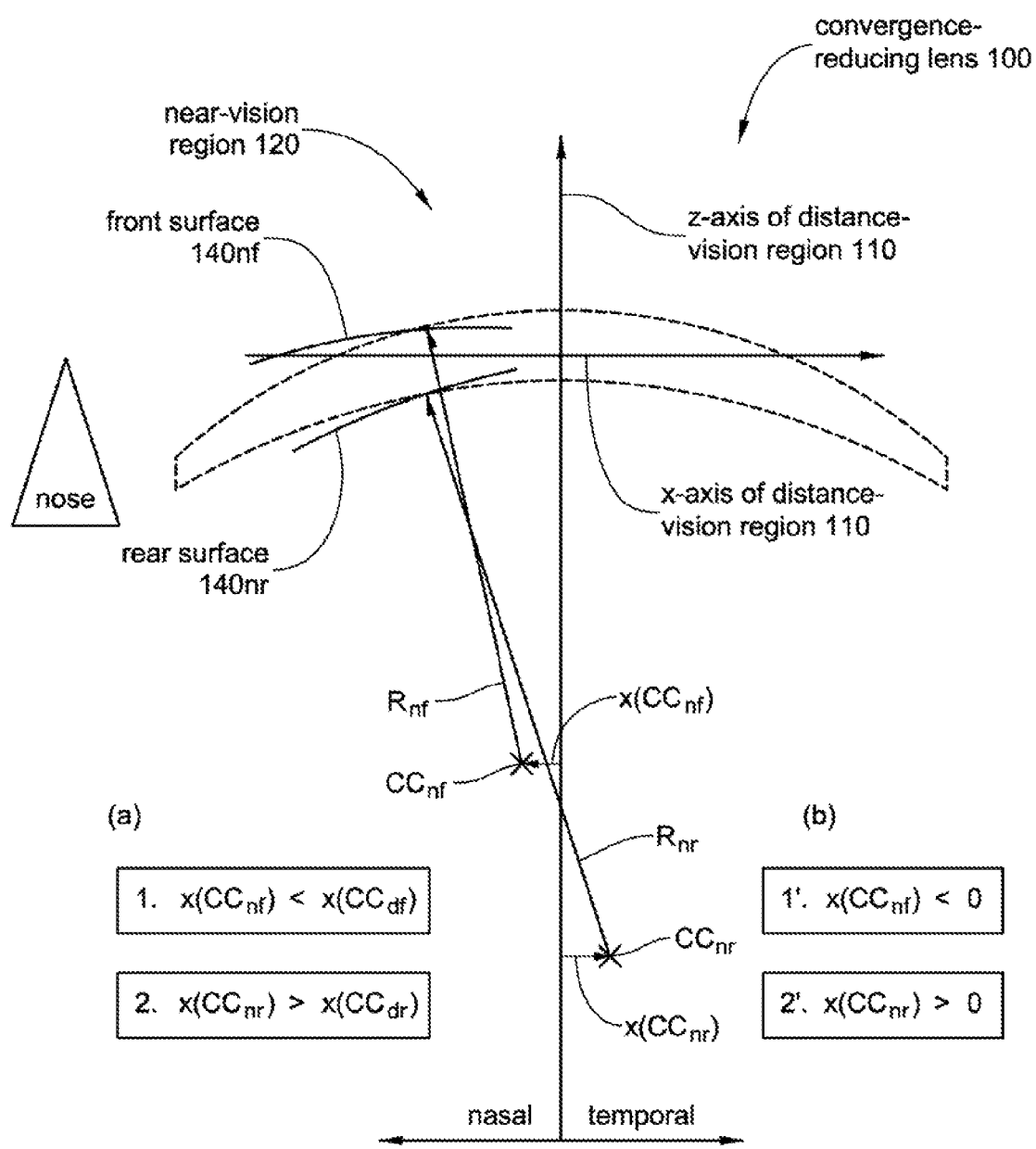

FIGS. 12A-B show embodiments of an eye-strain reducing lens 100, or convergence reducing lens 100. These embodiments can be characterized via a description of the curvatures of the lens surfaces and the off-center locations of their corresponding centers of curvatures. In some detail, embodiments of the eye-strain-reducing lens 100, or convergence-reducing lens 100 can have a central normal of the convergence-reducing lens that defines a z-axis 3. The z-axis 3 is typically also the z-axis of a distance-vision region 110. A central region of the convergence-reducing lens 100 can further define a tangential, centered x-y plane. The z-axis 3 and the x-y plane together define an x-y-z coordinate system.

The convergence-reducing lens 100 can include the above mentioned distance-vision region 110 with a non-negative distance-vision optical power, having a front distance-vision surface 140df with a radius of curvature $R_{df}$ and a center of front distance-vision curvature $CC_{df}$, and a rear distance-vision surface 140dr with a radius of curvature $R_{dr}$ and a center of rear distance-vision curvature $CC_{dr}$. The lens 100 can further include a near-vision region 120 with an optical power within 0.5 D of the distance-vision optical power, having a front near-vision surface 140nf with a radius of curvature $R_{nf}$ and a center of front near-vision curvature $CC_{nf}$, and a rear near-vision surface 140nr with a radius of curvature $R_{nr}$ and a center of rear near-vision curvature $CC_{nr}$; wherein an x-coordinate of the center of front near-vision curvature $x(CC_{nf})$ can be nasal relative to an x-coordinate of the center of front distance-vision curvature $x(CC_{df})$, or an x-coordinate of the center of rear near-vision curvature $x(CC_{nr})$ can be temporal relative to an x-coordinate of the center of rear distance-vision curvature $x(CC_{dr})$. Expressed the above attributes in inequalities, and using the directionality of the x-axis, such that points lying to the right, temporal direction have greater x coordinates than points lying to the left, nasal direction, these conditions can be written as:

$$x(CC_{nf}) < x(CC_{df}), \text{ or} \tag{14}$$

$$x(CC_{nr}) > x(CC_{dr}). \tag{15}$$

In some typical embodiments, the $CC_{df}$ front and $CC_{dr}$ rear centers of curvature of the distance-vision surfaces 140*df* and 140*dr* can be located on the z-axis 3 and therefore, their x coordinates can be zero. In formal terms, $x(CC_{df})=x(CC_{dr})=0$. In such embodiments, the convergence-reducing lens 100 can be configured so that $x(CC_{nf})$, the x-coordinate of the center of front near-vision curvature $CC_{nf}$, is nasal relative to the z-axis 3 of the coordinate system, i.e.:

$$x(CC_{nf}) < 0, \text{ or} \tag{16}$$

$x(CC_{nr})$, the x-coordinate of the center of rear near-vision curvature is temporal relative to the z-axis 3 of the coordinate system, i.e.

$$x(CC_{nr}) > 0. \tag{17}$$

In this sense, embodiments of the convergence-reducing lens 100 are off-axis center of curvature lenses.

The above-described coordinates and x-distances of the centers of curvature $x(CC_{nf})$, $x(CC_{nr})$, $x(CC_{df})$, and $x(CC_{dr})$ can be determined with specialized tools and devices, such as spherometers and lens profilometers.

Designs of the convergence-reducing lens 100 can achieve the optical power of the near-vision region 120 to match the optical power of the distance-vision region 110 within 0.5 D because the optical power in first approximation is given by the radii of curvature of the lens front and rear surfaces: Optical power (distance-vision)=$f(R_{df}, R_{dr})$, and Optical power (near-vision)=$f(R_{nf}, R_{nr})$. In the thin lens approximation, the optical power is proportional to $f(R_1, R_2)=(n-1)(1/R_1-1/R_2)$. As long as $f(R_{nf}, R_{nr})=f(R_{df}, R_{dr})$, the optical powers in the two regions are matching in a leading order approximation.

However, the above relations assume that the centers of curvatures are on the main optical axis of the lens. So, designs of the lens 100 can be viewed as built on the recognition that it is possible to leave the optical power of the near-vision region 120 essentially equal to that of the optical power of the distance-vision region 110 by not manipulating the radii of the corresponding curvatures, yet, to adjust and manipulate the near-vision refraction angles relative to the distance-vision refraction angles by moving the centers of curvature off the axis of the lens. More concisely, in designs of the lens 100 it is possible to make the refraction angles of the near-vision region different from the refraction angles of the distance-vision region, while preserving that the optical power of the near-vision region matches the optical power of the distance-vision region. The refraction angles and the optical powers of these two regions are adjustable relatively independently from each other.

Some embodiments of these convergence-reducing lenses 100 can be further characterized as follows. With reference to FIG. 11A, the front distance-vision surface 140*df* and the rear distance-vision surface 140*dr*, at an x-distance from a center of the coordinate system, can define a distance-vision surface convergence angle $\gamma_{dvr}$; and the front near-vision surface 140*nf* and the rear near-vision surface 140*nr* at the same x-distance from the center of the coordinate system can define a near-vision surface convergence angle $\gamma_{nvr}$, wherein in embodiments the near-vision surface convergence angle is smaller than the distance-vision surface convergence angle:

$$\gamma_{nvr} < \gamma_{dvr}. \tag{18}$$

The convergence-reducing, off-axis curvature center lenses 100 can be further characterized by, and combined with, the features described in relation to FIGS. 1-11.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

The invention claimed is:

1. A convergence-reducing lens of a low-convergence spectacle, wherein:
   a central normal of the convergence-reducing lens defines a z-axis, and a center of the convergence-reducing lens defines a tangential, centered x-y plane, together defining an x-y-z coordinate system of the convergence-reducing lens, the convergence-reducing lens comprising:
   a distance-vision region, having a non-negative distance-vision optical power, configured to refract a light ray, directed parallel to the z-axis at a distance-vision region point at an x-distance from a y-z plane of the coordinate system, to intersect the y-z-plane at a distance-vision intersection z-distance; and
   a near-vision region, having a near-vision optical power that matches the distance-vision optical power within 0.5 D, configured to refract a light ray, directed parallel to the z-axis at a near-vision region point at the x-distance of the distance-vision region point, to intersect the y-z-plane at a near-vision intersection z-distance that is greater than the distance-vision intersection z-distance.

2. The convergence-reducing lens of claim 1, wherein:
   the distance-vision region is configured to retract the light ray, directed parallel to the z-axis at the distance-vision region point at the x-distance, by a distance-vision refraction angle;
   the near-vision region is configured to refract the light ray, directed parallel to the z-axis at the near-vision region point at the x-distance, by a near-vision refraction angle; and
   an x-component of the near-vision refraction angle is smaller than an x-component of the distance-vision refraction angle that corresponds to the same x-distance.

3. The convergence-reducing lens of claim 1, wherein:
   the distance-vision region is configured to refract the light ray, directed parallel to the z-axis at the distance-vision region point at the x-distance, to intersect the y-z plane with a distance-vision gaze-convergence angle;

the near-vision region is configured to refract the light ray directed parallel to the z-axis at the near-vision region point at the x-distance, to intersect the y-z plane with a near-vision gaze-convergence angle; and the near-vision gaze-convergence angle is smaller than the distance-vision gaze-convergence angle that corresponds to the same x-distance.

4. The convergence-reducing lens of claim 1, comprising:
a progression region, at least partially between the distance-vision region and the near-vision region, configured to refract a light ray, directed parallel to the z-axis at a progression region point at the x-distance of the distance-vision region point, to intersect the y-z-plane at a progression intersection z-distance that is between the near-vision intersection z-distance and the distance-vision intersection z-distance.

5. The convergence-reducing lens of claim 1, wherein:
the near-vision region has an area larger than 5 mm².

6. The convergence-reducing lens of claim 1, wherein:
the near-vision region has an area larger than 10 mm².

7. The convergence-reducing lens of claim 1, wherein:
the near-vision optical power matches the distance-vision optical power within 0.25 D.

8. The convergence-reducing lens of claim 1, wherein:
the distance-vision optical power and the near-vision optical power are less than 0.5 D.

9. The convergence-reducing lens of claim 8, wherein:
the distance-vision optical power and the near-vision optical power are 0 D.

10. The convergence-reducing lens of claim 1, wherein:
the near-vision region is one of an oval, a quadrant, a triangle, a rectangle, an elongated region, a diagonal region, a channel and a corridor.

11. The convergence-reducing lens of claim 1, wherein:
a majority of the near-vision region is located in a lower-inferior nasal quadrant of the convergence-reducing lens.

12. The convergence-reducing lens of claim 1, comprising:
a front surface, having
  a distance-vision front-tangential at an x-distance from the center of the coordinate system, and
  a near-vision front-tangential at the same x-distance; and
a rear surface, having
  a distance-vision rear-tangential at the same x-distance, and
  a near-vision rear-tangential at the same x-distance; wherein;
the distance-vision front-tangential and the distance-vision rear-tangential make a distance-vision surface convergence angle, and
the near-vision front-tangential and the near-vision rear-tangential make a near-vision surface convergence angle, wherein:
the near-vision surface convergence angle is smaller than the distance-vision surface convergence angle.

13. The convergence-reducing lens of claim 1, wherein:
the distance-vision region has a distance-vision z-axis;
the near-vision region has a near-vision z-axis, wherein:
the near-vision z-axis is rotated in a nasal direction relative to the distance-vision z-axis.

14. A convergence-reducing lens, wherein:
a central normal of the convergence-reducing lens defines a z-axis, and a center of the convergence-reducing lens defines a tangential, centered x-y plane, together defining an x-y-z coordinate system of the convergence-reducing lens, the convergence-reducing lens comprising:
a distance-vision region, having a non-negative distance-vision optical power, configured to refract a light ray, directed by a source at a distance-vision region point at an x-distance from a y-z plane of the coordinate system, to make a distance-vision light-convergence angle with the y-z-plane, wherein the source is located on the z-axis at an intersection z-distance from a center of the coordinate system; and
a near-vision region, having a near-vision optical power that matches the distance-vision optical power within 0.5 D, configured to refract a light ray, directed by the source at a near-vision region point at the same x-distance from the y-z plane of the coordinate system, to make a near-vision light-convergence angle with the y-z-plane, wherein the source is located on the z-axis at the same intersection z-distance from the center of the coordinate system; wherein:
an x-component of the near-vision light-convergence angle is greater than an x-component of the distance-vision light-convergence angle.

15. A convergence-reducing lens of claim 14, wherein:
the distance-vision region is configured to refract a light ray, directed by the source at the distance-vision region point at the x-distance from the y-z plane of the coordinate system, by a distance-vision refraction angle;
the near-vision region is configured to refract a light ray, directed by the source at the near-vision region point at the x-distance from the y-z plane of the coordinate system, by a near-vision refraction angle; and
an x-component of the near-vision refraction angle is smaller than an x-component of the distance-vision refraction angle.

16. The convergence-reducing lens of claim 14, comprising:
a front surface, having
  a distance-vision front-tangential at an x-distance from the center of the coordinate system, and
  a near-vision front-tangential at the same x-distance; and
a rear surface, having
  a distance-vision rear-tangential at the same x-distance, and
  a near-vision rear-tangential at the same x-distance; wherein:
the distance-vision front-tangential and the distance-vision rear-tangential make a distance-vision surface convergence angle, and
the near-vision front-tangential and the near-vision rear-tangential make a near-vision surface convergence angle, wherein;
the near-vision surface convergence angle is smaller than the distance-vision surface convergence angle.

17. The convergence-reducing lens of claim 14, wherein:
the distance-vision region has a distance-vision z-axis;
the near-vision region has a near-vision z-axis, wherein:
the near-vision z-axis is rotated in a nasal direction relative to the distance-vision z-axis.

* * * * *

UNITED STATES PATENT AND TRADEMARK OFFICE
CERTIFICATE OF CORRECTION

PATENT NO. : 10,048,512 B2  
APPLICATION NO. : 15/289163  
DATED : August 14, 2018  
INVENTOR(S) : Jeffrey P. Krall and Aric Plumley Page 1 of 1

It is certified that error appears in the above-identified patent and that said Letters Patent is hereby corrected as shown below:

On the Title Page

Item (72) Inventors, Line 3-4, please DELETE inventor:
"Gergely T. Zimanyi, Berkeley, CA (US)" from said inventors.

Signed and Sealed this  
First Day of February, 2022

Drew Hirshfeld  
*Performing the Functions and Duties of the*  
*Under Secretary of Commerce for Intellectual Property and*  
*Director of the United States Patent and Trademark Office*